F. SKERL AND F. J. GRAEF.
TICKET ISSUING ACCOUNTING MACHINE.
APPLICATION FILED MAY 22, 1916.

1,338,876.

Patented May 4, 1920.
13 SHEETS—SHEET 2.

Inventors
Francesco Skerl
Forrest J. Graef

Carl Burst
Attorneys

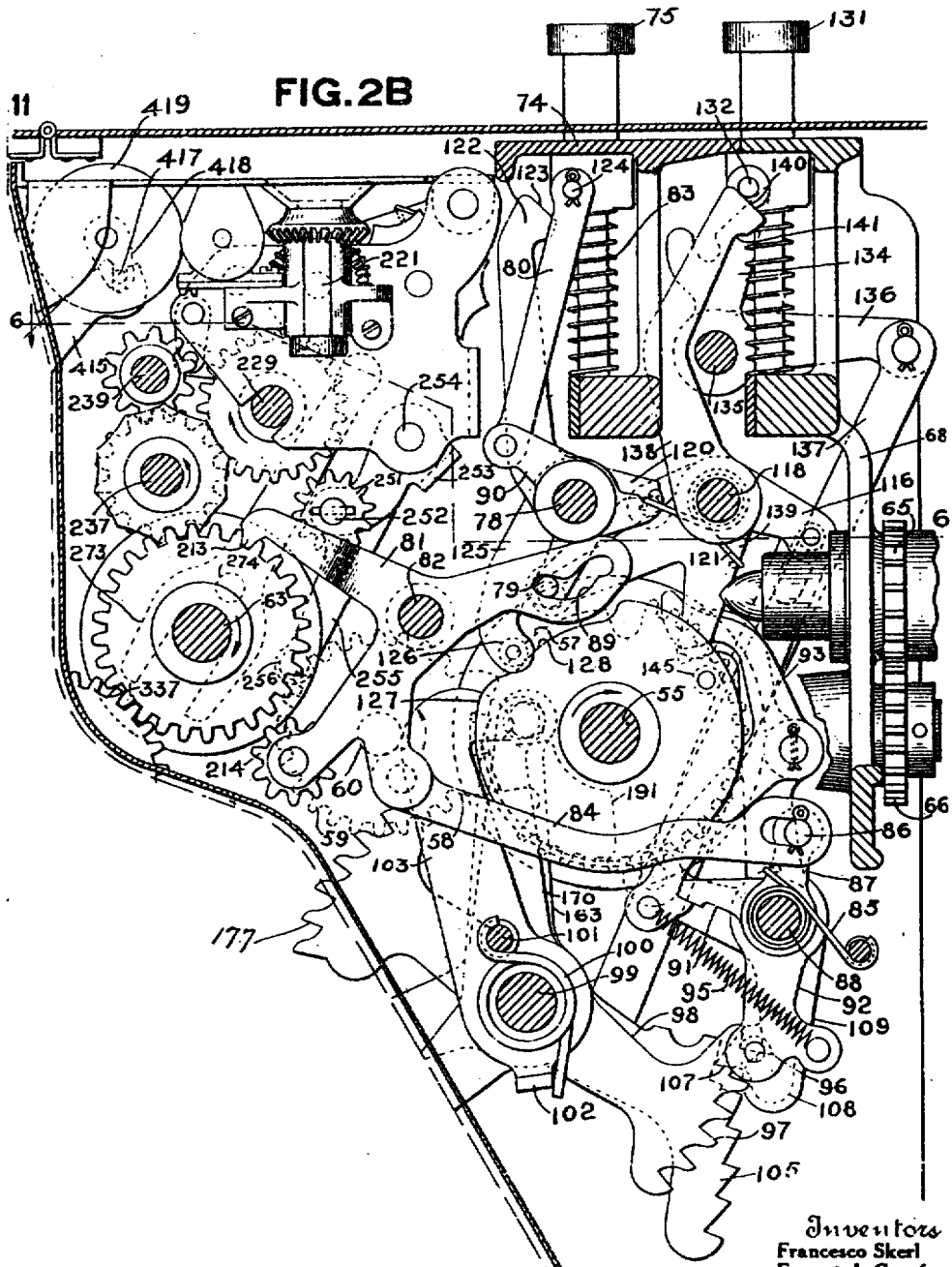

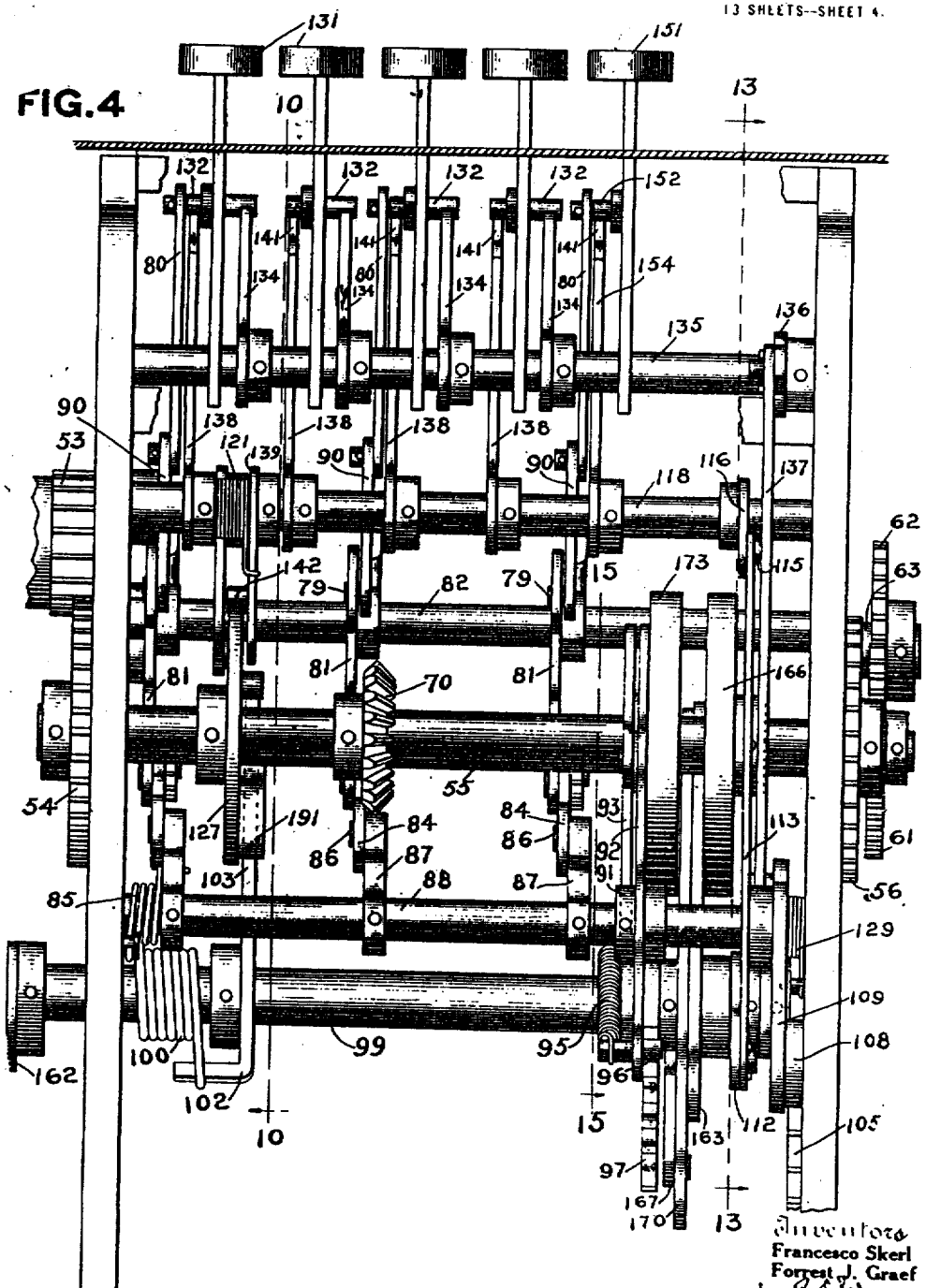

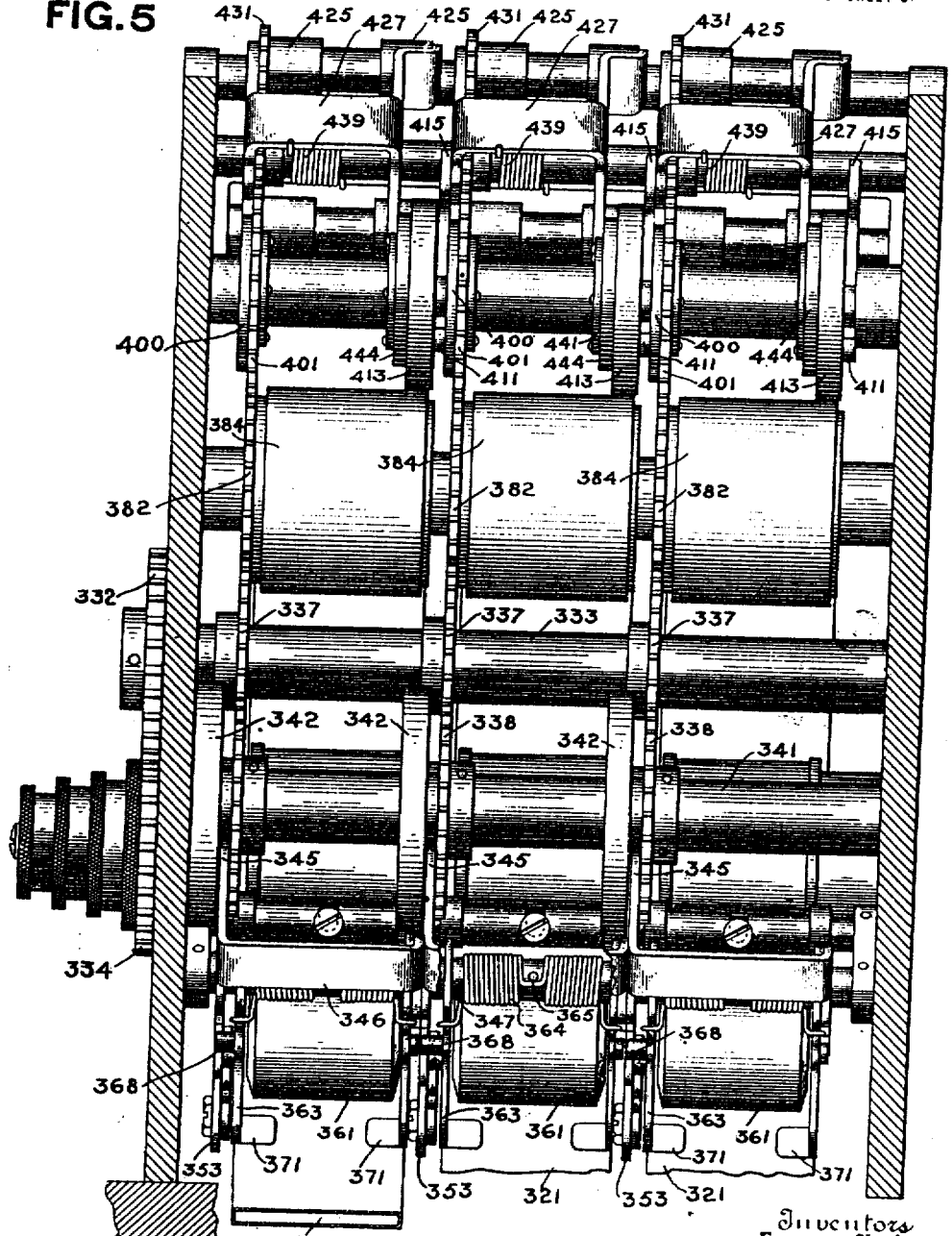

F. SKERL AND F. T. GRAEF.
TICKET ISSUING ACCOUNTING MACHINE.
APPLICATION FILED MAY 22, 1916.

1,338,876.

Patented May 4, 1920.
13 SHEETS—SHEET 6.

Inventors
Francesco Skerl
Forrest J. Graef
by
Carl Benst
Attorneys

F. SKERL AND F. J. GRAEF.
TICKET ISSUING ACCOUNTING MACHINE.
APPLICATION FILED MAY 22, 1916.

1,338,876.

Patented May 4, 1920.
13 SHEETS—SHEET 9.

F. SKERL AND F. J. GRAEF.
TICKET ISSUING ACCOUNTING MACHINE.
APPLICATION FILED MAY 22, 1916.
1,338,876.
Patented May 4, 1920.
13 SHEETS—SHEET 11.
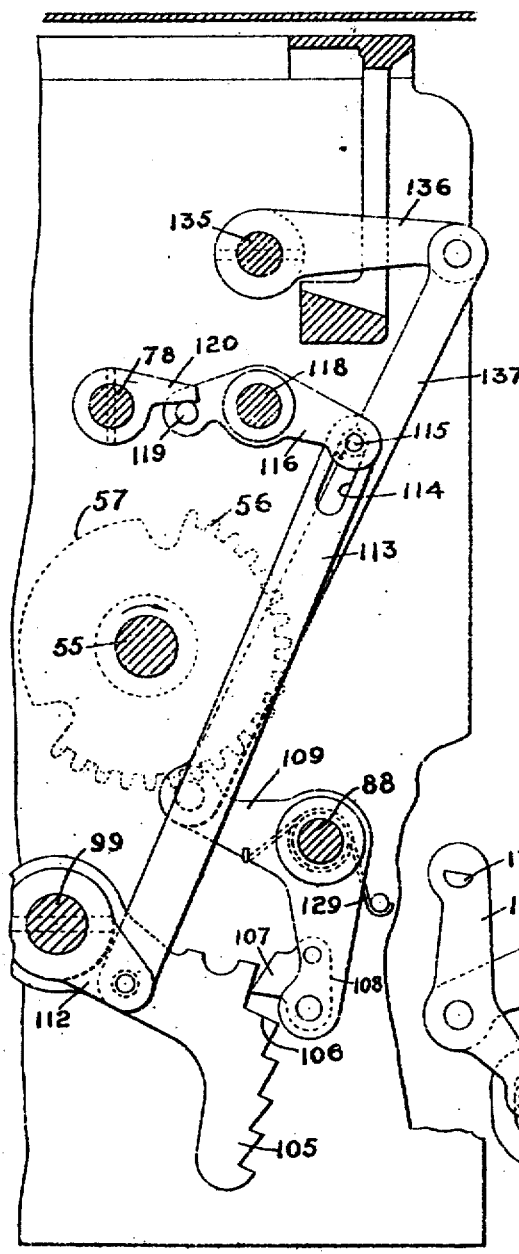
FIG.13
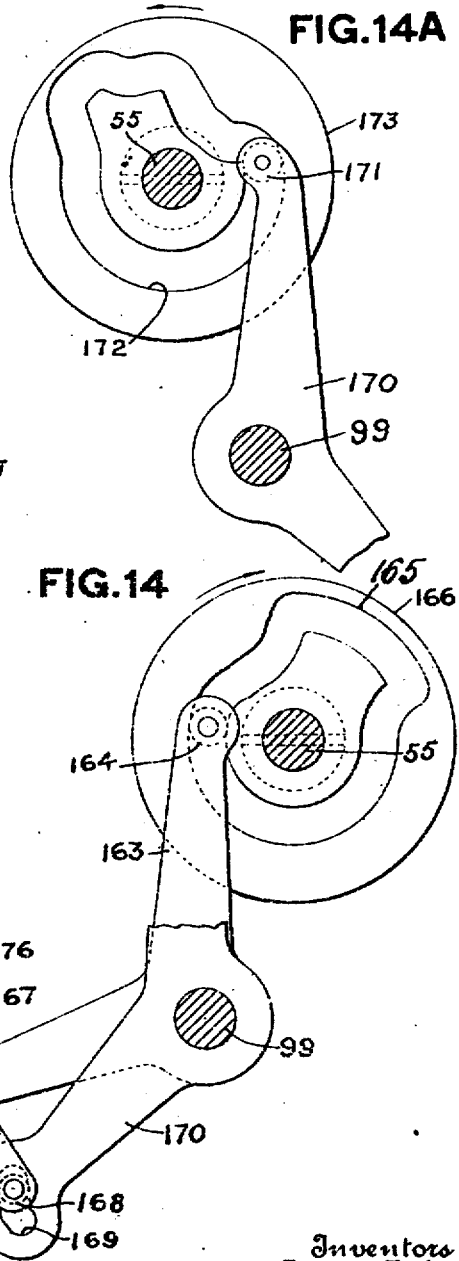
FIG.14A
FIG.14
Inventors
Francesco Skerl
Forrest J. Graef
Attorneys F. SKERL AND F. J. GRAEF.
TICKET ISSUING ACCOUNTING MACHINE.
APPLICATION FILED MAY 22, 1916.
1,338,876.
Patented May 4, 1920.
13 SHEETS—SHEET 12.
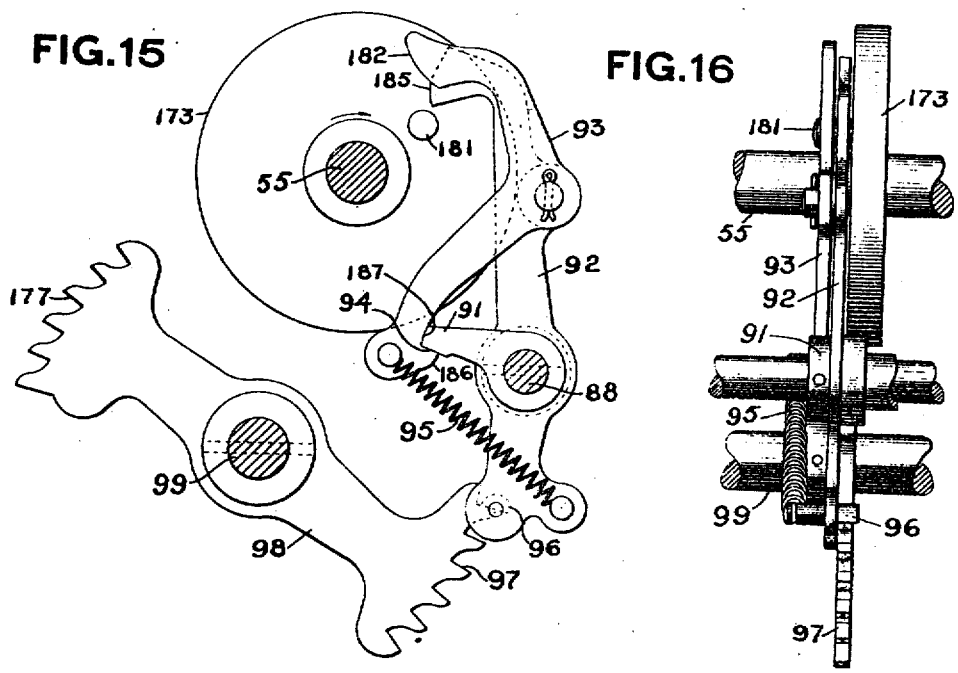
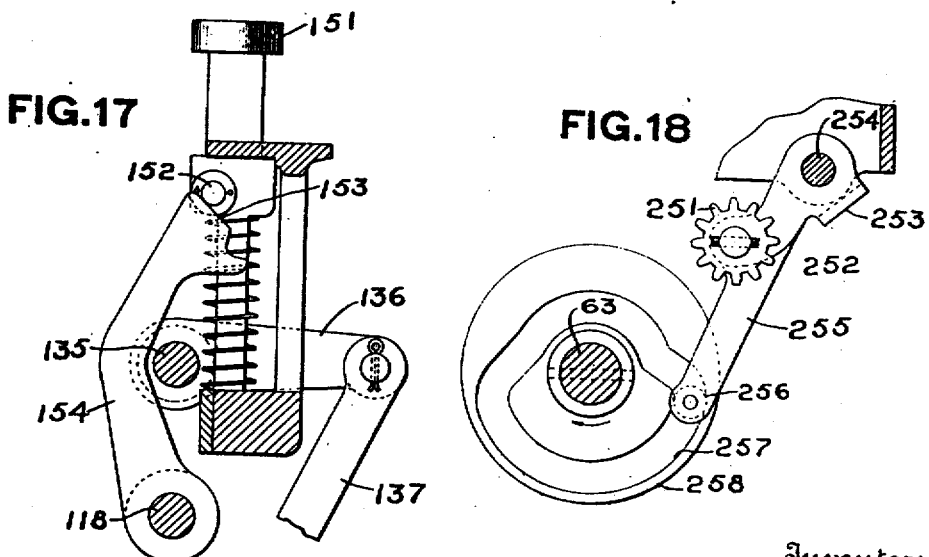
Inventors
Francesco Skerl
Forrest J. Graef
Karl Benst
Attorneys F. SKERL AND F. J. GRAEF.
TICKET ISSUING ACCOUNTING MACHINE.
APPLICATION FILED MAY 22, 1916.
1,338,876.
Patented May 4, 1920
13 SHEETS—SHEET 13.
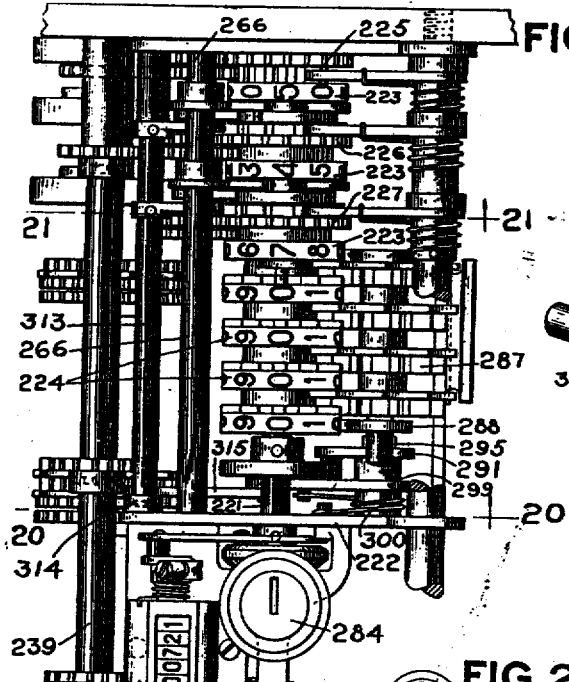
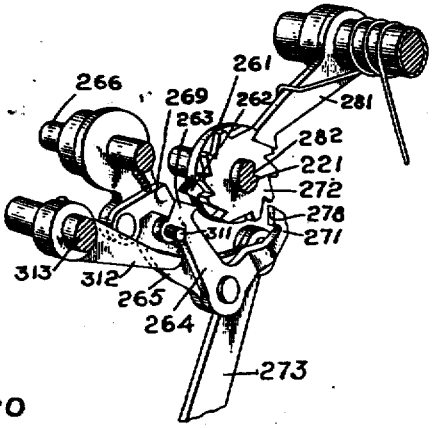
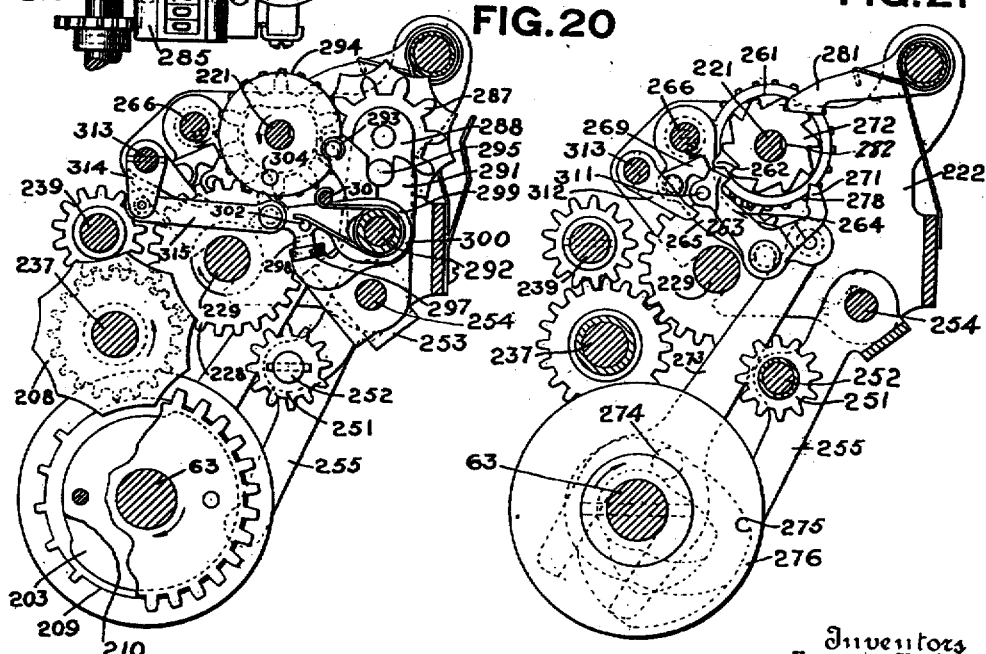
Inventors
Francesco Skerl
Forrest J. Graef
Earl Benot
Attorneys

UNITED STATES PATENT OFFICE.

FRANCESCO SKERL AND FORREST J. GRAEF, OF DAYTON, OHIO, ASSIGNORS TO THE NATIONAL CASH REGISTER COMPANY, OF DAYTON, OHIO, A CORPORATION OF OHIO, (INCORPORATED IN 1906.)

TICKET-ISSUING ACCOUNTING-MACHINE.

1,338,876.            Specification of Letters Patent.        Patented May 4, 1920.

Application filed May 22, 1916. Serial No. 99,097.

*To all whom it may concern:*

Be it known that we, FRANCESCO SKERL, a citizen of Austria, and FORREST J. GRAEF, a citizen of the United States, residing at Dayton, in the county of Montgomery and State of Ohio, have invented certain new and useful Improvements in Ticket-Issuing Accounting-Machines, of which we declare the following to be a full, clear, and exact description.

This invention relates to improvements in ticket issuing and accounting machines and has particular reference to machines of the kind constructed to issue tickets of several different classes or prices and add the value on a totalizer as each ticket is issued.

In the accompanying drawings the invention is shown applied to the machine of the type fully shown and described in application 802,101 for United States Letters Patent filed November 20, 1913 by Francesco Skerl. This machine is only used, however, because it permits showing the invention to the best advantage and it is not the desire to be limited to this one embodiment.

One object of the invention is to provide a simple compact machine for use in the ticket offices of theaters and in other places where several different classes of tickets having fixed values are used.

Another object of the invention is to provide an improved totalizer actuating mechanism for machines which are required to add only a few different fixed amounts. In the form shown a single actuator is provided for one class of tickets, two actuators for another and three actuators for a third class, the actuators for each class being constructed to add a different amount than the actuators for the other classes. A key is provided for each of the classes of tickets and when one of the keys is pressed the corresponding actuators are rendered effective to drive the totalizer during the subsequent operation of the machine. The arrangement and construction of the actuators shown in the drawings is illustrative only. As will be clear later on, the number of actuators employed for each class may readily be changed and the actuators themselves may be constructed to add any fixed amounts. In fact the principal advantage of the actuator construction employed is that in building a machine actuators may be put in con-
structed to meet the requirements of any theater or other place where the machine is to be employed.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figure 1 is a partial top plan view of the assembled machine with the lid raised to show the location of the cash totalizer the resetting and the ticket counters.

Figs. 2^A and 2^B taken together are a substantially true section through the machine just inside of the left hand side frame.

Fig. 4 is a front view of the mechanism shown in Fig. 2^D looking to the left in said figure with some of the frames and other parts omitted for the sake of clearness.

Fig. 5 is a sectional view of the machine on the line 5—5 in Fig. 2^A looking to the left in said figure with some of the parts omitted for the sake of clearness.

Figure 10:
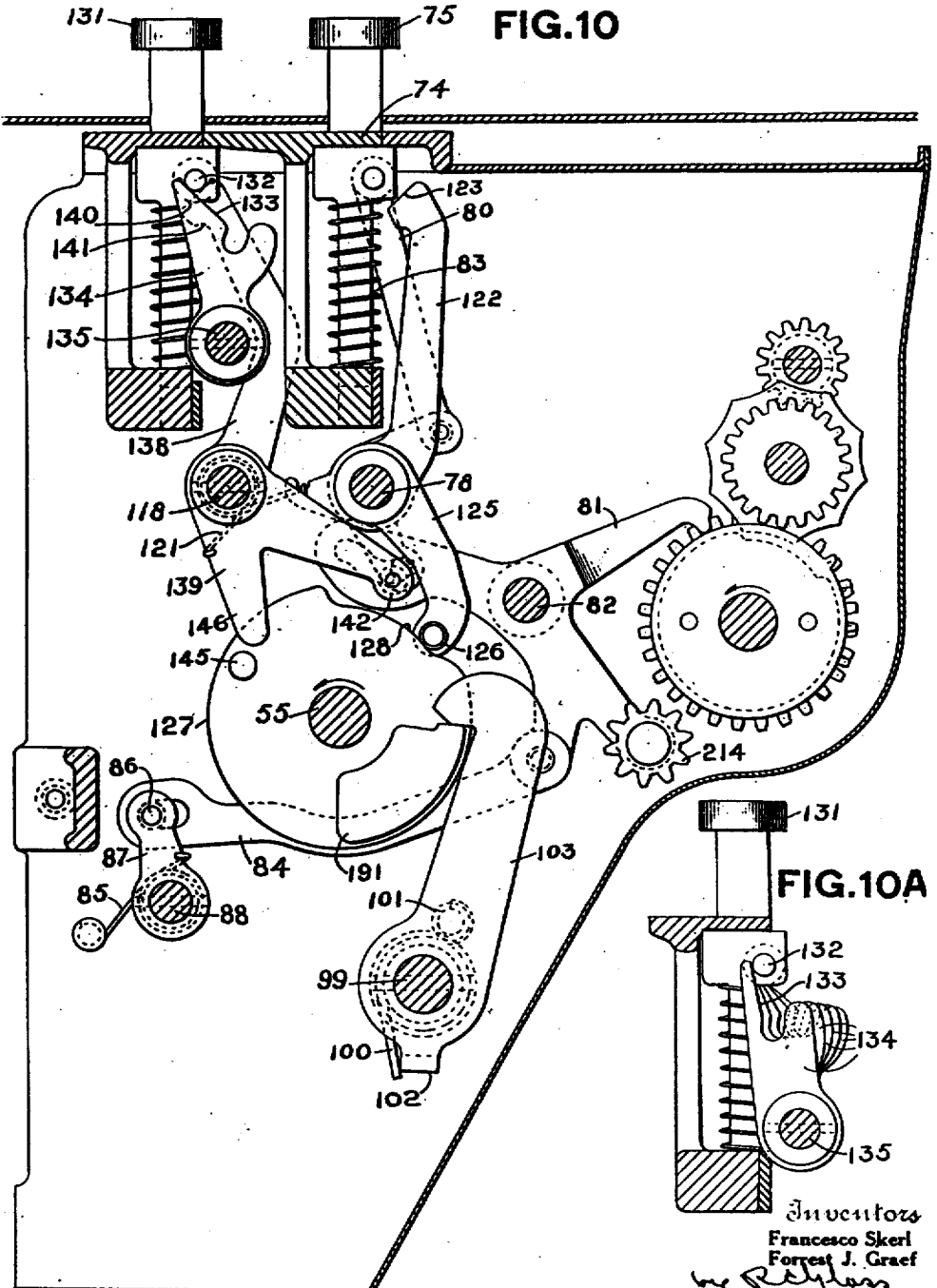
Fig. 10 is a section taken on the line 10—10 of Fig. 4 looking in the direction of the arrow.

Fig. 10^A is a detail of the number keys and the arms coöperating therewith for controlling the number of operations.

Figure 2A:
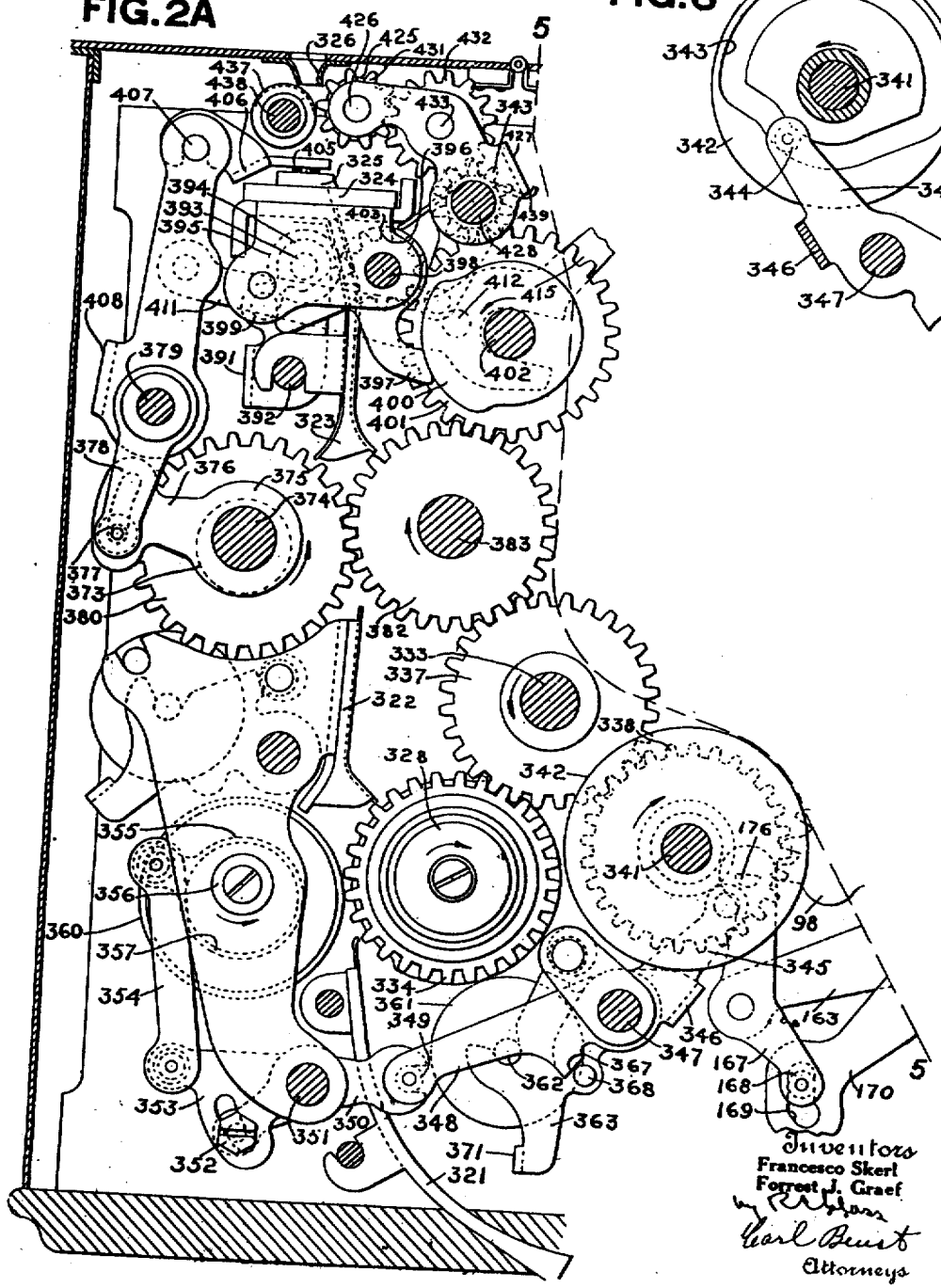
Figure 11:
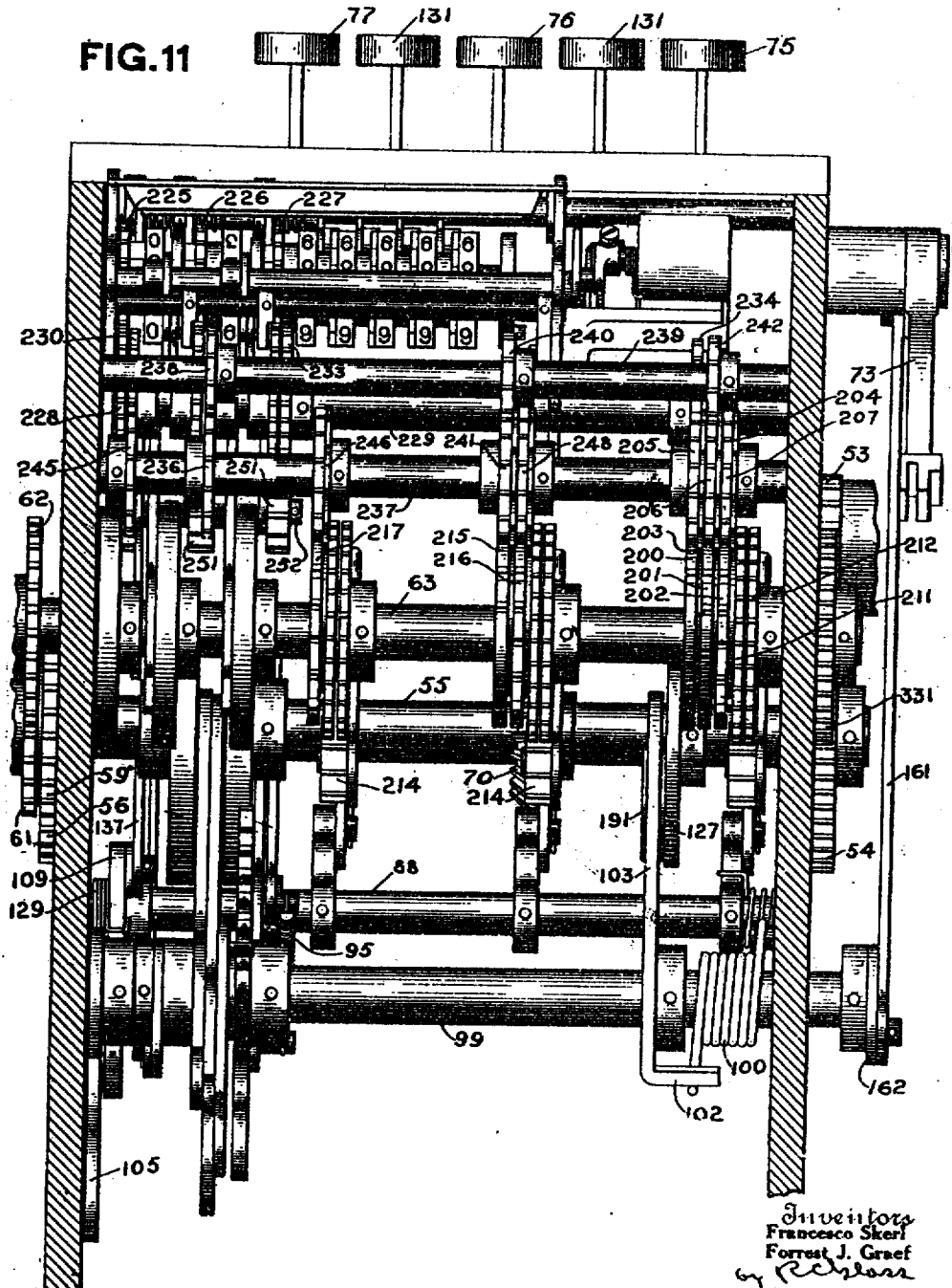
Figure 12:
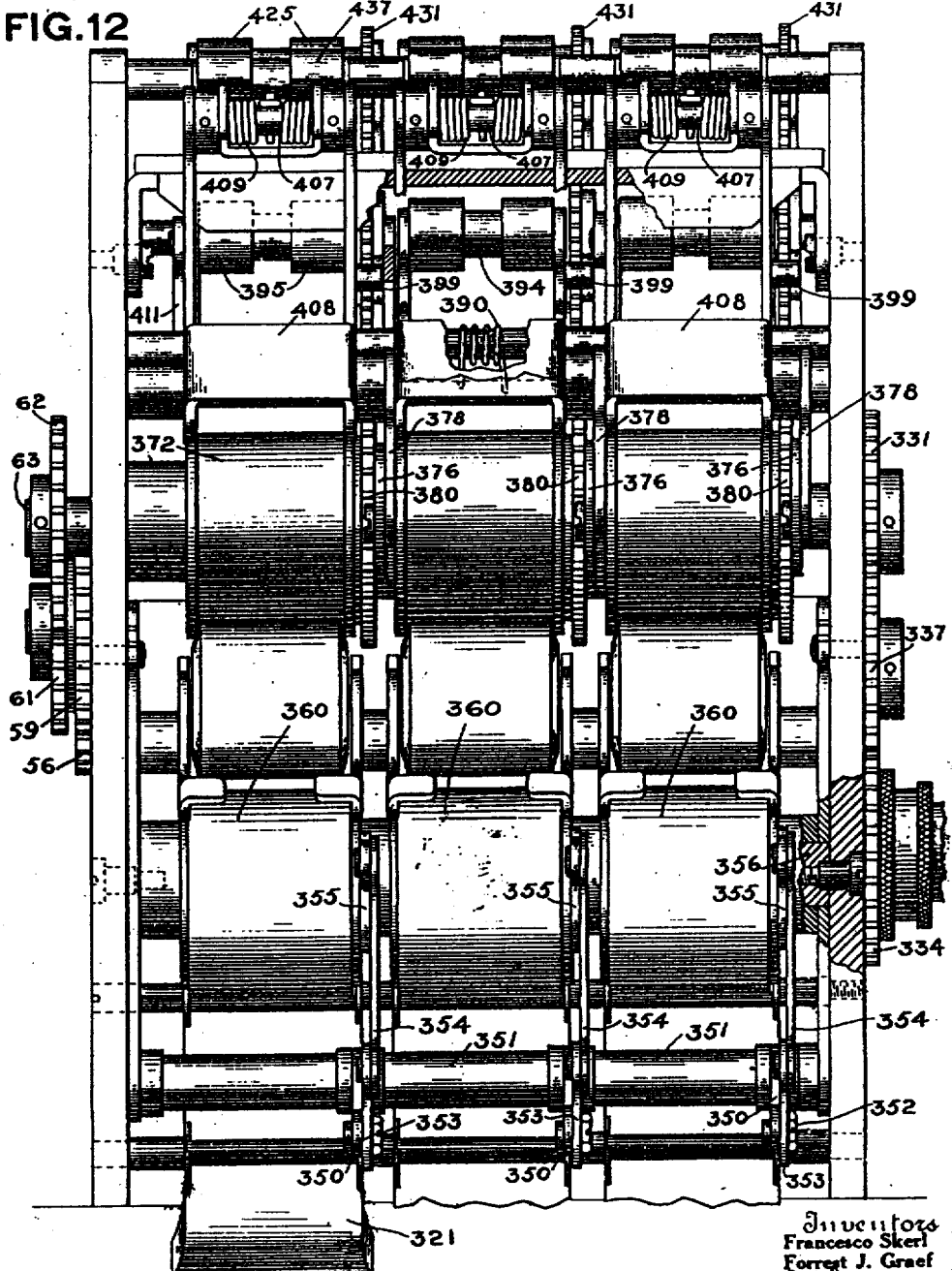

Fig. 11 is a section taken on the line 11—11 in Fig. 2^B looking to the right in said figure with some of the parts omitted to expose others more clearly to view Fig. 12 is a rear elevation of the mechanism looking to the right in Fig. 2^A with some of the parts broken away.

Fig. 13 is a partial section on the line 13—13 of Fig. 4 looking in the direction of the arrows.

Figs. 14 and 14^A are details of cams and levers employed for restoring the mechanism controlling the number of operations of the machine.

Fig. 15 is a section taken on the line 15—15 of Fig. 4, looking in the direction of the arrow.

Fig. 16 is a front elevation of the devices shown in Fig. 15 and looking to the left in said figure.

Fig. 17 is a detail of the release key and the arm coöperating therewith.

Fig. 18 is a detail of the cam and mechanism operated thereby for connecting and disconnecting the totalizer and the operating mechanism.

Fig. 19 is a top plan view of the totalizer and some of its operating connections.

Fig. 20 is a section taken on the line 20—20 of Fig. 19 looking in the direction of the arrow.

Fig. 21 is a section taken on the line 21—21 of Fig. 19 looking in the direction of the arrow.

Fig. 22 is a detail of the transfer mechanism associated with one of the elements of the totalizer and some of the connections for restoring the transfer mechanism in case it should be tripped when the totalizer is turned to zero.

The machine in the drawings is arranged to issue tickets of three different classes. The purpose of the different classes is immaterial, but for convenience they are usually spoken of herein as the first, second and third class tickets depending upon the value, the first class tickets being, of course, the tickets of highest value. The tickets of each class are fed from a strip by independently operable feeding mechanism controlled by keys in a keyboard and as each ticket is issued its value is entered on a cash totalizer.

The totalizer is actuated by three sets of actuating devices one for each class of tickets. All of the actuators are normally disconnected from the driving mechanism, but when a key is depressed to cause tickets of a certain class to be issued the corresponding actuating devices are connected to the driving mechanism. Then when the driving mechanism is operated to feed one or more tickets the connected actuator will drive the totalizer a number of times corresponding to the number of tickets issued. These actuators may be constructed to add any desired amount but in the present instance they are constructed to add $1.25 for the first class tickets, 25¢ for the second class tickets and 5¢ for the third class tickets. It is apparent, of course, that there probably would be no use commercially for a machine to add amounts differing to such an extent and these amounts are only employed in the present instance to illustrate the possibilities of the construction.

The keyboard mechanism resembles in some respects the keyboard shown in the Skerl application and controls the operating mechanism in a similar way. One of the variations from the construction in the Skerl application referred to is that in the present instance the keys run from right to left across the keyboard instead of from front to rear. One advantage resulting from this change is that it permits bringing the keys in closer relation to the mechanism they control and thereby results in a much more compact machine.

In operating the machine all that is necessary to issue one ticket of any class is to operate the key assigned to that particular class. If more than one ticket is desired, before the key just mentioned is operated, it is first necessary to depress a key bearing a digit corresponding to the number of tickets desired, after which the key for the class of tickets is depressed to release the operating mechanism. The operating mechanism then operates one or more times, depending upon the manipulation of the keys and at each operation a ticket is issued.

*Driving mechanism.*

Figure 9:
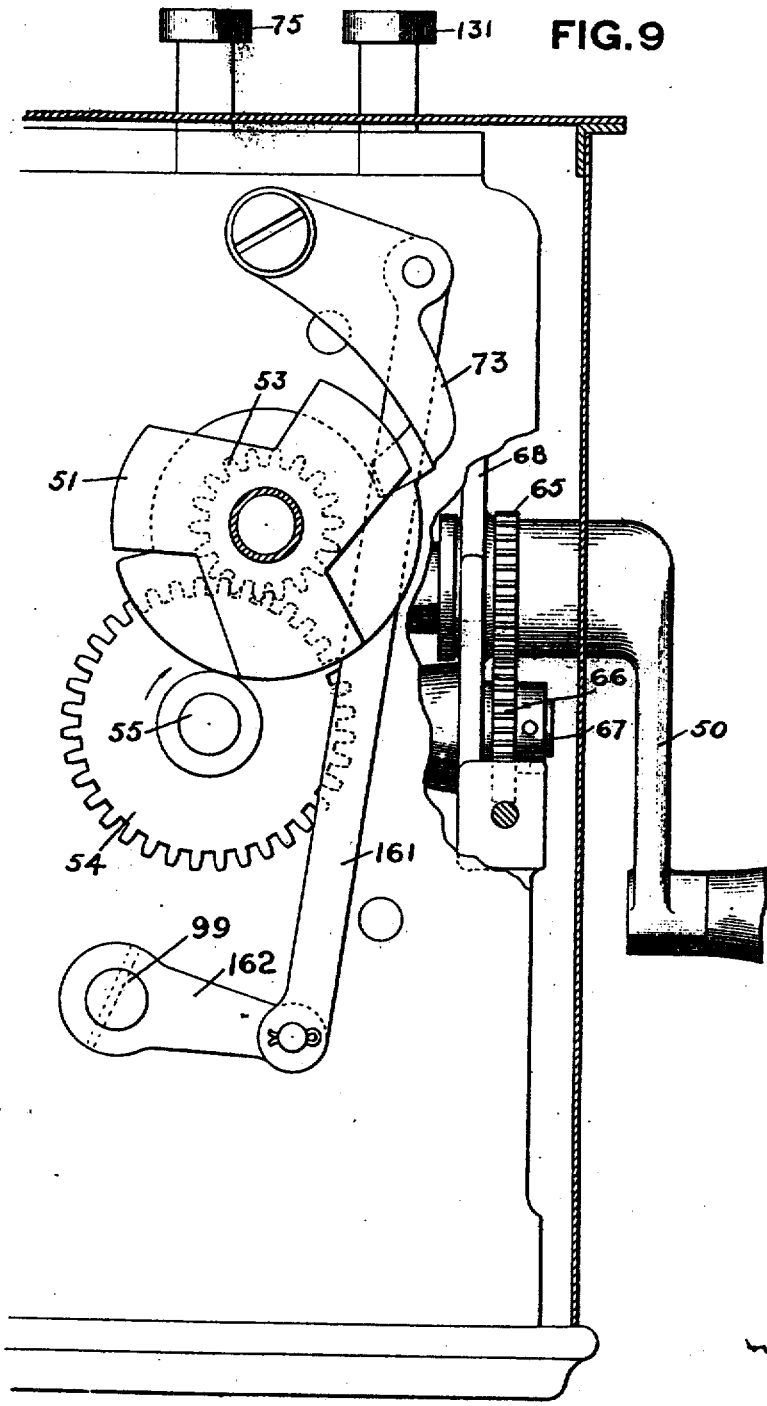
Fig. 9 shows some of the driving mechanism, but is intended particularly to show some of the mechanism for controlling the operation of the motor.

The machine is arranged to be operated either by means of a motor or an operating handle 50 (Fig. 9). The motor used is of the type fully shown and described in United States Letters Patent 1,144,418 issued June 29, 1915, to Chas. F. Kettering and Wm. A. Chryst. Said patent also shows the operating connections employed between the motor and the driving mechanism. The motor is not shown herein and only enough of the operating connections, designated generally by the numeral 51 (Fig. 9) are shown to show where the power is applied to the machine. The operating connections comprise a gear 53 (Figs. 4 and 9) driven by the motor, this gear meshing with a gear 54 fastened to a driving shaft 55 (Figs. 2^B, 4, 6, 9 and 13) journaled in the side frames of the machine. Attached to the right end of the shaft 55 is a mutilated gear 56 the locking portion 57 of which engages a locking portion 58 of a mutilated gear 59 loose on a stud 60. Rigid with the mutilated gear 59 is a full gear 61 meshing with a gear 62 fastened to a shaft 63. The gearing just recited is so proportioned that for each two rotations of the motor driven gear 53 the shafts 55 and 63 will each make a complete rotation, but, owing to the construction of the mutilated gears 57 and 59, the shaft 63 will complete its movement ahead of the shaft 55. The purpose of this is to permit complete operation of adding and printing mechanism driven by the shaft 63 before the shaft 55 completes its work.

Figure 6:
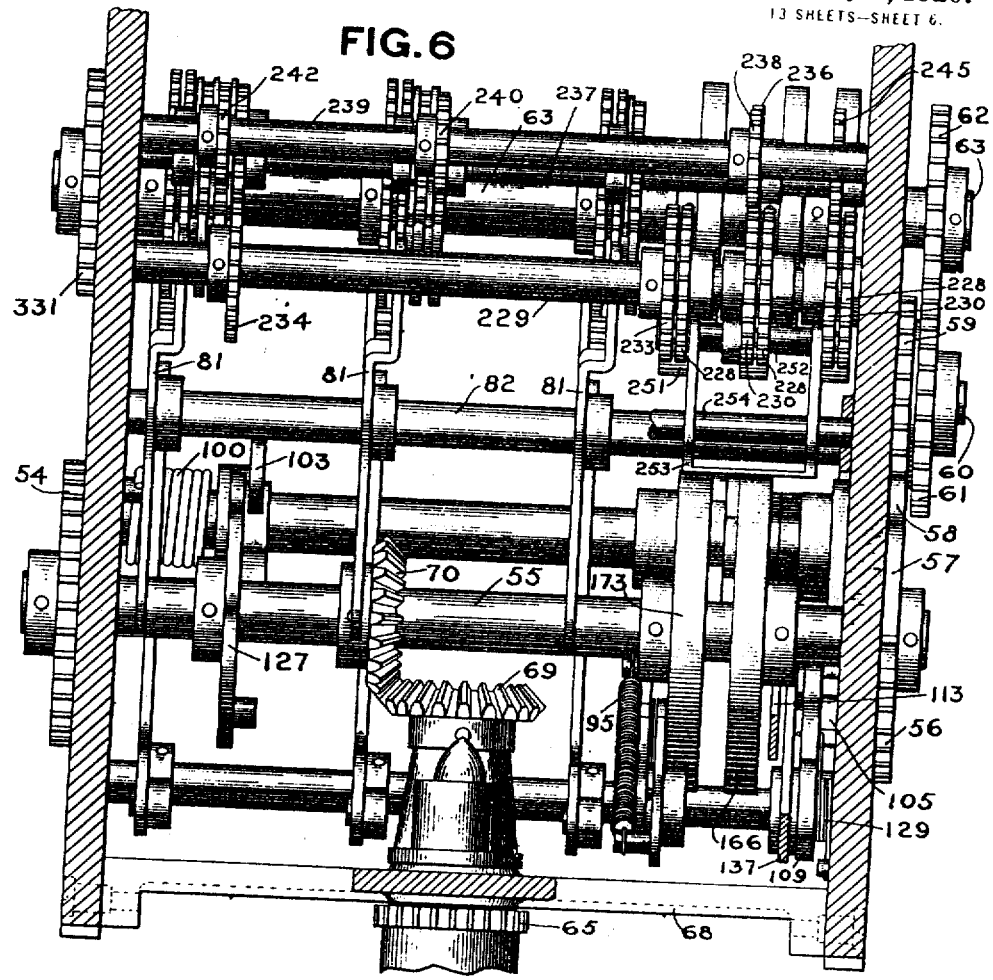
Fig. 6 is a section taken on the line 6—6 of Fig. 2^B looking in the direction of the arrow.

The operating handle 50 has a one way driving connection (not shown) with a gear 65 (Figs. 6 and 9) meshing with a gear 66 attached to a short shaft 67 journaled in the front frame 68 of the machine. Fastened to the rear end of the shaft 67 is a bevel gear 69, meshing with a bevel gear 70 attached to the shaft 55. These gears are so proportioned that for each turn of the handle the driving shaft 55 makes a complete rotation.

As previously stated, one or more tickets may be issued at a time. The number depends upon the number of operations of the driving shafts 55 and 63, as the construction is such that each time said shafts operate a ticket is printed and ejected. The mechanism for controlling the number of operations of the shafts is substantially the same as shown in the Skerl application mentioned above. This mechanism comprises an arm 73 (Figs. 9 and 11) which normally coacts with the motor connections 51 in such a way that operation of the motor and driving shafts is prevented. As will be clear later, when the machine is to be operated, depression of the controlling keys will result in swinging the arm 73 from one to five steps away from the normal position in which it is shown and at each rotation of the driving shafts the arm will be returned one step until it is finally again in position to stop the driving mechanism and break the circuit through the motor. The mechanism controlling the arm 73 will be described somewhat in detail later on.

Keyboard.

As before stated, the machine is in the present instance, arranged to issue three classes of tickets herein called the first, second and third class tickets. Each class of tickets is represented on the keyboard by a key, the key for the first class being designated by the numeral 75 (Fig. 1) and the keys for the second and third classes being designated respectively by the numerals 76 and 77. For convenience these keys are usually referred to hereinafter as the price keys.

The price keys are mounted in frames 74 (Figs. 2ᴮ and 10) in such a way as to be limited to endwise movement. Surrounding the stem of each key is a spring 83 for returning the key to normal position after its work has been completed. Depression of any price key releases the motor and driving mechanism and couples the corresponding actuating and printing mechanism to said driving mechanism. When the operating mechanism is released by depression of a price key devices are rendered effective for temporarily retaining the operated key in depressed position.

In order to accomplish the various results just mentioned, each price key has a pin 124 on which is pivoted one end of a link 80, the other end of the link being pivoted to one arm of a bell crank 90 loosely mounted on a shaft 78. The other arm of each bell crank carries a stud 79 projecting through a cam slot 89 in an element 81 (Figs. 2ᴮ and 10) loosely mounted upon a rod 82. The cam slot 89 is so shaped that when a key is depressed and the bell crank 90 rocked counter clockwise as viewed in Fig. 2ᴮ the element 81 will be rocked clockwise as shown in said figure or counter clockwise as viewed in (Fig. 10). One of the lower arms of the element 81 is loosely connected to a link 84 having a slot at its forward end engaging a stud 86 attached to an arm 87 fastened to a rock shaft 88. When the element 81 is rocked, as just described, the shaft 88 will also be rocked against the tension of a spring 85. It should be understood that each of the three price keys rocks the shaft 88 to exactly the same extent and that the slots in the links 84 are to permit movement of one link without disturbing the others. This movement of the shaft is to release the operating mechanism.

The releasing mechanism comprises an arm 91 (Figs. 2ᴮ, 15 and 16) fastened to the rock shaft 88. Loosely mounted on the shaft 88 is a lever 92 to the side of which is pivoted a bell crank 93. The bell crank 93 has a shoulder 94 normally in engagement with the rearward end of the arm 91, being held in engagement by a spring 95 connecting the lower arm of the bell crank 93 and the lower end of the lever 92. Projecting from the lower arm of the lever 92 is a square sided stud 96 normally in engagement with the uppermost one of a series of teeth 97 formed in the forward end of a lever 98 attached to a rock shaft 99. By tracing the connections through it will be seen that when any price key is depressed and the shaft 88 rocked, the arm 91 on the shaft will coöperate with the bell crank 93 in such a way as to rock the lever 92 on the shaft 88 and thereby withdraw the stud 96 from engagement with the tooth on the lever 98. The lever 98 and shaft 99 are then rocked in a counter clockwise direction.(Figs. 2ᴮ and 15) by a spring 100 which is coiled about the shaft 99 and is bent at one end to engage a stud 101 attached to the left hand machine frame, the other end being in engagement with a lug 102 projecting laterally from an arm 103 rigidly mounted on the rock shaft 99.

Fastened to the rock shaft 99 is also a stepped plate 105 (Figs. 2ᴮ, 4 and 13) which at the normal position of the parts is so held that when the stud 96 is disengaged to release the lever 98 the shaft 99 will be permitted to rock one step before the uppermost step 106 on the plate 105 engages an arresting tooth 107. This arresting tooth is formed on a block 108 attached to the side of a bell crank 109 loosely mounted on the rock shaft 88. When the shaft 99 rocks this one step the driving mechanism is released and the motor caused to give the shafts 55 and 63 a single rotation. During this rotation a ticket will be issued and the price thereof entered on the totalizer.

When the shaft 99 rocks it actuates mechanism for temporarily retaining the depressed price key in depressed position, the driving mechanism shortly after it begins to operate then locking the depressed keys in and the undepressed keys out until the operation is practically completed. This mechanism for temporarily retaining the keys comprises an arm 112 (Fig. 13) fastened to the rock shaft 99 and a link 113 pivotally connected to the arm 112 and having a slot 114 surrounding a stud 115 projecting from a lever 116. The lever 116 is loosely mounted upon a shaft 118 and at its rear end carries a stud 119 projecting under an arm 120 fastened to the rock shaft 78. Rigid with the shaft 78 is an arm 122 for each of the three price keys. When the rock shaft 99 is latched in its normal position the link 113 holds the lever 116 and arms 122 in the positions shown, but when the rock shaft 99 is released its first movement will elevate the link 113 to free the lever 116 whereupon a torsion spring 121 engaging one arm of a bell crank 125 fast on the shaft 78 will rock the shaft and the arms 122 thereon to carry a shoulder 123 on one of the arms over the pin 124 projecting from the side of the operated key. The upper ends 123 of the other arms 122 will at the same time come below the pins 124 of the two undepressed keys.

As stated above, shortly after the driving mechanism begins to move the depressed key is locked in and the undepressed keys out until the operation is practically completed. This is effected by a cam 127 (Figs. 2ᴮ, 4, 6 and 10). In the periphery of the cam is a cut away portion 128. A roller 126 carried by one arm of the bell crank 125 normally rests in this cut away portion, but when the shaft 78 is rocked the roller is carried out of said portion and held out until the shaft 78 is restored. As soon as the shaft 55 begins to turn the cut away portion 128 is carried from under the roller 126, thereby locking the bell crank 125 and shaft 78 against movement until the shaft has about completed its rotation.

As above pointed out the normal position of the bell crank 109 is such that the rock shaft 99 is permitted to rock a single step and this results in a single rotation of the driving shafts 55 and 63 to issue a single ticket and add the price of the ticket on the totalizer. When it is desired to issue more than one ticket it is necessary to move the bell crank 109 against the tension of a spring 129 (Figs. 4 and 13) to position its arresting tooth 107 to engage one of the lower steps of the arm 105 before the rock shaft 99 is released. This result is accomplished by number keys 131 (Fig. 1) bearing numerals to indicate the number of tickets which will be issued if the respective keys are operated. Pins 132 projecting from the keys 131 coöperate with inclined edges 133 (Figs. 2ᴮ, 10 and 10ᴬ) of arms 134 attached to a rock shaft 135 and fastened to the rock shaft 135 is an arm 136 connected by a link 137 to the bell crank 109. It is apparent that any movement of the rock shaft 135 will be imparted to the bell crank 109. The edges 133 on the arms 134 are differentially inclined so that operation of different keys 131 will result in different extents of movement of the bell crank. For example the edge 133 of the arm 134 for the key bearing the numeral "2" is inclined at such an angle that operation of the "2" key will rock the bell crank 109 far enough for its arresting tooth 107 to be in position to engage the second step from the top on the lever 105 while the edge 133 for the key bearing the numeral "5" is so inclined that operation of that key will turn the bell crank 109 far enough for its arresting tooth 107 to engage the fifth or lowermost step on the arm 105 when the rock shaft 99 is released. This predetermines the number of rotations of the driving shafts 55 and 63. That is to say, if for instance, the "5" key has been depressed the driving shafts will make five continuous rotations and issue five tickets.

The keys 131 are temporarily retained in depressed position by arms 138 fastened to the rock shaft 118. Fastened to the rock shaft 118 is also a two-armed element 139 engaged by the torsion spring 121 in such a way that the spring holds inclined upper ends 140 of the arms 138 in contact with the pins 132 in the number keys 131. When one of the keys 131 is depressed its pin will first cam the arms 138 rearward and after the key has been depressed far enough the spring 121 will return the arms to engage a shoulder 141 with the pin 132 in the operated key and latch the key in depressed position. The inclined portions 140 of the other arms will, of course, at the same time again reëngage the pins 132 in the undepressed keys.

The second arm of the two-armed element 139 carries a roller 142 projecting across the edge of the cam 127. When a key 131 is depressed the element 138, will, of course, be rocked, this rocking movement being permitted by the cut-away portion 128 of the cam. Shortly after the rotation of the driving shaft 55 begins the cut away portion of the cam is carried from under the roller 142, thereby preventing any movement of the element 138 and consequently locking all of the keys 131.

At the end of the first rotation of the shaft 55 a stud 145, attached to the side of the cam 127, will strike the lower end 146 of the element 139 and rock the shaft 118, thereby releasing the depressed key. The spring on the key will then return the key to its normal position. The rock shaft 135 is not, however, necessarily restored to its original position when the key is released, the return of the arms being effected by the spring 129, previously mentioned. At each rotation of the driving shafts 55 and 63 the rock shaft 99 and stepped arm 105 are returned one step and as each step is carried down out of engagement with the arresting tooth 107, the spring 129 will rock the bell crank 109 one step until the final movement of the parts has been completed. Each step of the return movement of the bell crank 109 is transmitted through the link 137 so that by the time the bell crank has reached its starting point the shaft 135 and arms 134 attached thereto will also have assumed its normal positions in which they are shown.

Figure 1:
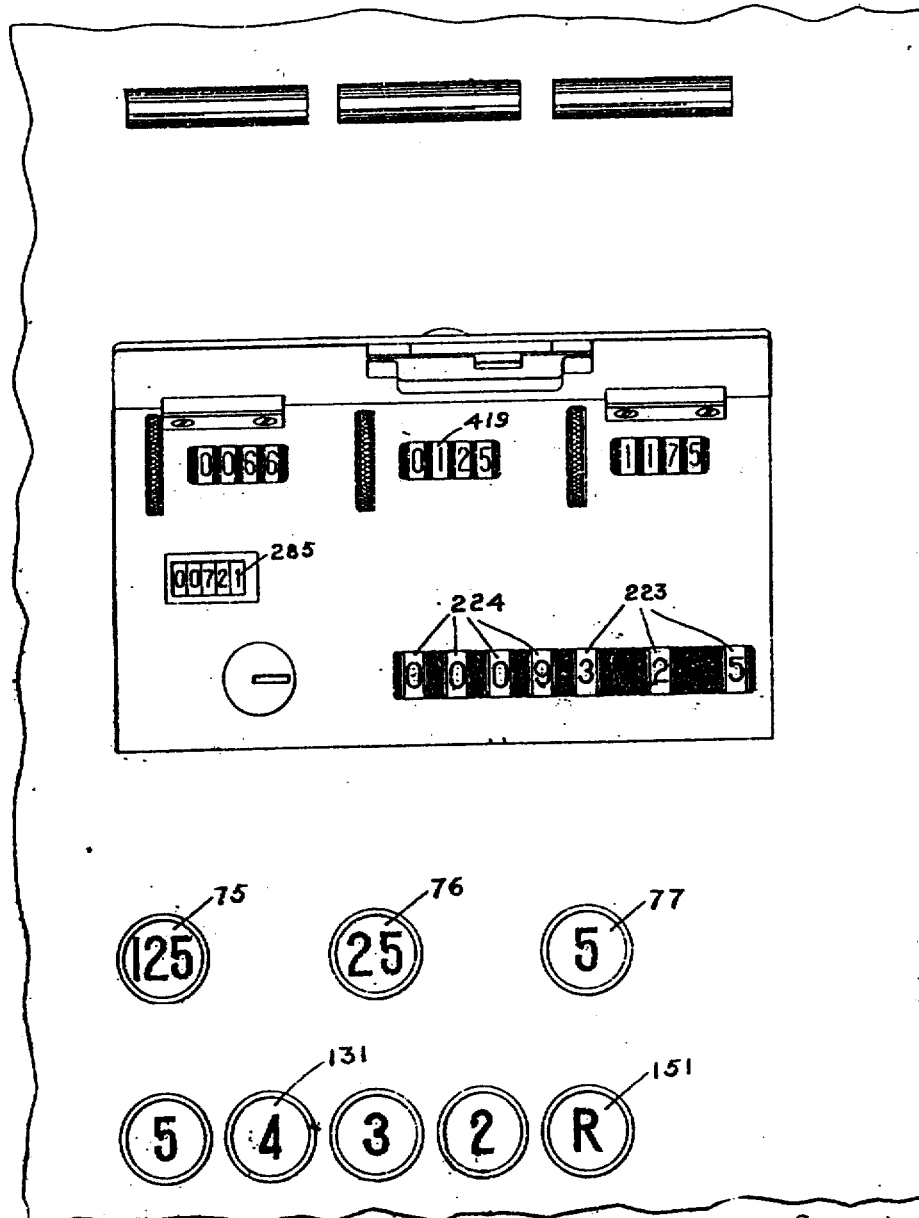

In order to permit releasing any number key 131 which has been operated by mistake there is provided a release key 151 (Figs. 1, 4 and 17). This release key has no arm 134 such as is provided for each of the other four keys in the same row, but its pin 152 is in engagement with an inclined edge 153 at the upper end of an arm 154 attached to the shaft 118. The construction is such that if the key 151 is depressed the shaft 118 will be rocked counter clockwise (Figs. 2ᴮ and 17), thereby disengaging the arm 138 from the pin 132 of any key 131 which has been depressed and the key 131 will then be restored by its spring.

*Operating mechanism.*

As previously stated, when the machine is to be operated the arm 73 (Fig. 9) controlling the motor is swung from one to five steps away from the normal position in which it is shown and is returned one step at each rotation of the driving shafts 55 and 63 until it is again in position to stop the driving mechanism and break the circuit through the motor. This movement is imparted to the arm 73 through a link 161 loosely connected to an arm 162 fastened to the left hand end of the rock shaft 99. When the rock shaft is released and rocked by its spring 100, as previously described, the arm 73 will be raised a corresponding distance.

The mechanism for restoring the shaft 99 and thereby the arm 73 comprises a bell crank 163 (Figs. 2ᴮ, 4, 11, 14 and 14ᴬ) loosely mounted upon the rock shaft 99. The upwardly extending arm of the bell crank carries a roller 164 projecting into a cam groove 165 in a disk 166 fastened to the driving shaft 55. The other arm of the bell crank carries a centrally pivoted lever 167 to which is attached a stud 168 projecting through a cam slot 169 in one arm of a bell crank 170 which is also loosely mounted on the rock shaft 99. The upwardly extending arm of the bell crank 170 has a roller 171 (Fig. 14ᴬ) projecting into a cam groove 172 in the side of a disk 173 fastened to the driving shaft 55. At each rotation of the shaft 55 the bell cranks 163 and 170 are first rocked counter clockwise (Fig. 14) as a unit by their respective cam grooves. The cam groove 172 then rocks the bell crank 170 slightly in a clockwise direction (Fig. 14) relative to the bell crank 163 and this, because of the shape of the cam slot 169, rocks the lever 167 to engage a square sided stud 176 thereon with the under side of whichever tooth 177 on the rear end of the lever 98 is at the time opposite the stud. The bell cranks 163 and 170 are then rocked as a unit in a clockwise direction (Figs. 2ᴮ and 14) thereby raising the rear end of the lever 98 and restoring the rock shaft 99 one step toward its normal position. The bell crank 170 is then rocked slightly counter clockwise (Figs. 2ᴮ and 14) or clockwise as viewed in Fig. 14ᴬ thereby withdrawing the stud 176 from engagement with the tooth 177.

Before the stud 176 is completely disengaged, however, a stud 181 (Fig. 15) attached to the side of the cam disk 173 will strike the inclined portion 182 of the bell crank 93 and disengage the shoulder 94 on the bell crank from the arm 91 on the rock shaft 88 and the spring 95 will then rock the lever 92 to engage the stud 96 thereon with one of the teeth 97 on the forward end of the lever 98 and retain the lever 98 and rock shaft 99 in the position to which they have just been moved by the stud 176. During subsequent rotations of the driving shaft 55 when several tickets are to be issued at one operation, the spring 95 will cause the lever 92 and its stud 96 to coöperate with the teeth 97 in the manner of a retaining ratchet, but in order to make this retaining movement positive and prevent trouble in case the spring 95 should become ineffective, at the proper point in the operation the stud 181 engages a nose 185 on the lever 92 and rocks the lever to engage the stud 96 with the tooth 97 in case this has not already been done by the spring.

It will be remembered that when a price key is depressed the shaft 88 is rocked one step in a counter clockwise direction (Figs. 2ᴮ and 15) and that this rocks the bell crank 93' and lever 92 as a unit about the shaft. When the stud 181 engages the bell crank 93 to disengage its shoulder 94 from the arm 91 and the spring 95 or stud 181 rocks the lever 92 to engage the stud 96 with one of the teeth 97, the portion 186 of the bell crank will rest against the end 187 of the arm 91 until the shaft 88 to which the arm is attached is restored to its original position. This, however, does not occur until the price key has been released, and, as previously explained, the price key is not released until the rock shaft 99 completes its final step of restoring movement. If the price key is held depressed at the end of the operation the shaft 88 will simply be held in its rocked position so that the end 187 of the arm 91 will still be in contact with the portion 186 of the bell crank 183. This prevents manipulating the machine, as it is always necessary to allow the price key to return to undepressed position so that the spring can rock the shaft 88 back to its original position to engage the arm 91 with the shoulder 94 on the bell crank 93 before the machine can again be released by operation of a price key.

In referring to the arm 73 it was stated that the arm, among other things, stops the driving mechanism at the end of the operation. In order to make it certain that the driving mechanism is stopped at the proper point if the arm 73 should fail, the rock shaft 99 has fastened thereto the arm 103 previously referred to. This arm has a shoulder at its upper end normally in engagement with a block 191 (Figs. 2ᴮ, 10 and 11) fastened to the side of the cam disk 127. When the machine is released and the shaft 99 rocked, as previously described, the shoulder on the arm will be disengaged from the block 191 to free the shaft 55 for rotation. At each step of restoring movement of the shaft 99 the arm 103 is, of course, restored a like extent and during the final step of movement of the rock shaft the shoulder on the arm is again brought into position to engage the block 191 and prevent further movement of the shaft 55.

*Totalizing mechanism.*

As previously stated, the present machine is arranged to issue three classes of tickets and separate actuators are provided for each of the different classes. For the first class or higher priced tickets three actuators are provided arranged to add $1.25 on the totalizer. There are two actuators for the second class tickets constructed to add $0.25, while there is only one actuator for the third class tickets, this actuator being constructed to add $0.05. These actuators are all loose on the driving shaft 63 and operation of the corresponding price key connects either the first, second or third class actuators to the driving shaft so that at each rotation of the shaft the connected actuators will drive the totalizer.

The actuators for the first class tickets are located at the left side of the machine, their position in the machine corresponding to the position of the first-class price key 75 on the keyboard. These actuators are, as best shown in Figs. 11 and 20, in the form of disks having on their peripheries teeth corresponding in number to the number of steps of movement to be imparted to the corresponding elements of the totalizer. As shown in the figure first mentioned the dollar actuator 200 has a single tooth, the dimes actuator 201 has two teeth and the cents actuator 202 has five teeth. Rigid with the actuators are locking plates 203, one for each actuator, to coöperate with star wheels 204 rigid with pinions 205, 206 and 207. These pinions are engaged respectively by the teeth of the actuators 200, 201 and 202 when the actuators are rotated as hereinafter described and after the actuators have completed their work, curved portions 208 (Fig. 20) of the star wheels 204 engage the peripheries 209 of the locking plates 203 and aline the pinions 205, 206 and 207. At the normal position of the parts and during rotation of the pinions 205, 206 and 207 with the actuators remaining at normal position cut away portions 210 of the locking plates 203 are under the star wheels 204 so that the pinions are free to rotate.

Rigid with the actuators 200, 201 and 202 is a gear 211 and beside this gear 211 is a companion gear 212 fastened to the shaft 63. In the normal position of the parts the gear 211 is held against movement by a tooth 213 (Fig. 2ᴮ) on an arm of the element 81. When, for example, the first-class price key 75 is depressed and the corresponding element 81 rocked, as previously described, the tooth 213 will be withdrawn and a broad tooth pinion 214 carried by the element engaged with the gears 211 and 212 thereby connecting the gear 211 and the actuators rigid therewith to the driving shaft 63. Then at each rotation of the shaft the pinions 205, 206 and 207 will be turned a number of steps corresponding to the number of teeth on their respective actuators. These movements of the pinions are transmitted directly to the totalizers through the connections described later on.

The actuators for the second class tickets are constructed to add 25¢ on the totalizer, the dimes actuator 215 having two teeth and the cents actuator 216 having five teeth. The single actuator 217 for the third class tickets has but five teeth. The actuators 215, 216 and 217 and parts immediately connected therewith need not be described in detail because they are similar to the first-class actuators previously described and are connected to the driving mechanism by broad tooth pinions 214 in the same way when the corresponding price keys are operated.

The totalizer in the present instance comprises seven adding elements rotatably mounted on a shaft 221 (Figs. 2ᴮ, 19, 20 and 21) rotatably mounted in a stationary frame 222. The three lower order elements 223 are driven by the actuating mechanism just described while the four higher order elements 224 are to record transfers and are each rotated a step at the end of each complete rotation of the next lower order wheel. Rigid with each of the three lower order elements is a gear, the gear for the cents, dimes and dollars adding elements being designated respectively by the numerals 225, 226 and 227. These three gears mesh with gears 228 (Fig. 6) loosely mounted upon a shaft 229 extending across the machine. At the side of the gears 228 for the cents and dimes elements are gears 230 loose on the shaft 229 while adjacent the gear 228 for the dollars adding element is a gear 233 fastened to the shaft 229. At the other end of the shaft 229 is fastened a gear 234 meshing with the pinion 205 driven by the dollar actuator 200. The gear 230 for the dimes adding element meshes with a gear 236 (Fig. 11) loose on the shaft 237 supporting the pinions driven by the actuators. Meshing with the gear 236 is a gear 238 secured to the shaft 239. Fastened to the shaft 239 is a gear 240 meshing with a pinion 241 driven by the second class dimes actuator 215 and a gear 242 meshing with the pinion 206 driven by the dimes actuator 201 for the first-class tickets. The gear 230 for the cents adding element meshes with a gear 245 fastened to the shaft 237. Fastened to the shaft 237 is a pinion 246 meshing with the cents actuator 217 for the third class tickets, a pinion 248 driven by the cents actuator 216 for the second class tickets, and the pinion 207 driven by the cents actuator 202 for the first-class tickets. When the first-class price key 75 is depressed and the corresponding broad tooth pinion 214 engaged with the companion gears 211 and 212 on the shaft 63 subsequent operation of the machine will operate through the connections just described to rotate the gears 230 for the cents and dimes totalizer elements and the gear 233 for the dollars element. If the second class price key 76 is operated the gears 230 for the cents and dimes adding wheels will be rotated while if the third class price key 77 is operated only the gear 230 for the cents adding wheel will be actuated. On the other hand it is apparent that when, for example, the cents actuator 217 only is operated the pinions 207 and 248 for the higher value tickets will be actuated but owing to the fact that the teeth of the actuators are out of the path of the teeth on the pinions the actuators for the higher class tickets will not be disturbed. At the same time, as previously stated, the cut away portions of the locking plates 203 rigid with the actuators will permit rotation of the star wheels rigid with the pinions.

The reason for providing the companion gear 230 and 233 for the gears 228 meshing with gears 225, 226 and 227 of the adding elements is to make it possible to disconnect the totalizer from the actuating mechanism so that the totalizer may be more easily turned to zero. Otherwise, the three lower order elements of the totalizer could be geared directly by means of an intermediate gearing to the pinions driven by the actuators.

Normally the companion gears are disconnected but at the beginning of each rotation of the driving shaft 63 they are coupled together by broad tooth pinions 251 (Figs. 2ᴮ, 6, 11, 18 and 20) rotatably mounted on a rod 252 supported by a rock frame 253 loosely mounted on a rod 254 supported by the totalizer frame 222. This frame is rocked by means of an arm 255 carrying a roller 256 (Fig. 18) engaging a cam groove 257 in the side of a disk 258 fastened to the shaft 63. The cam groove 257 is so shaped that at the beginning of the rotation of the shaft 63 the frame 253 will be rocked clockwise (Figs. 2ᴮ and 20) thereby engaging the pinions 251 with the three pairs of companion gears and connecting the three lower order elements of the totalizer with the actuating mechanism. After sufficient time has elapsed for all of the actuators to perform their function the frame 253 is rocked back to its original position, thereby disconnecting the totalizer from the actuating mechanism.

The transfer mechanism associated with the three lower order elements of the totalizer is best shown in Figs. 21 and 22. Rigid with each of the three lower order elements is a disk 261 on the periphery of which is formed a tooth 262, which as an adding element passes from nine to zero, will engage the inclined edge 263 of a bell crank 264 pivoted to the side of an arm 265 loosely mounted on a rod 266. The bell crank 264 is normally held in the position shown by a spring pressed pawl 269, but when the tooth 262 engages the edge 263 of the bell crank 264, the bell crank will be rocked counter clockwise (Figs. 21 and 22) and retained in the new position by the pawl 269. In this new position a nose 271 of the bell crank will be in position to engage one of the teeth on a ratchet 272 rigid with the totalizer element. After the actuators have performed their function and the broad tooth pinions 251 have been withdrawn to disconnect the totalizer from the actuating mechanism the arms 265 are rocked counter clockwise (Figs. 21 and 22) by pitmen 273 pivoted to the arms and carrying rollers 274 projecting into cam grooves 275 in disks 276 fastened to the shaft 63. These grooves are arranged to actuate the pitmen successively from lower to higher order in the usual way and as the pitmen are operated the engaged noses 271 of the bell cranks will turn the adding elements one division. As they do this, the teeth of the ratchets 272 will co-operate with the edges 278 of the bell cranks in such a way as to rock the bell cranks back to their original position with reference to the arms 265 and they will then be retained in this position by the pawls 269. Spring operated pawls 281 constantly in engagement with the teeth of the ratchets 272 prevent the adding elements from retrograde movement or being overthrown by a fast operation of the machine.

The mechanism for turning the totalizer to zero is of a type well known in the art and need only be described briefly here. For the purpose of turning the adding elements to zero the shaft 221 has a square sided groove 282 which, when the shaft is rotated in one direction, will engage the ends of spring pressed pawls (not shown) attached to the sides of the adding elements. The shaft is rotated by means of the usual key operated lock 284 (Fig. 19), the barrel of which is geared to the shaft 221 in such a way that by inserting a key in the lock 284 and turning the key the shaft 221 will be given a complete rotation in the proper direction and carry all of the adding elements to zero. A counter 285 is connected to the lock 284 in such a way as to be operated to add one each time the totalizer is turned to zero.

Transfers between the four higher order elements 224 of the totalizer are effected by a Geneva stop mechanism designated generally by the numeral 287 and carried in a frame 288 pivoted on the rod 254. At the beginning of a rotation of the shaft 221 the frame 288 is rocked to disengage the Geneva stop mechanism from the higher order adding elements. This is effected by a plate 291 (Figs. 19 and 20) pivoted on a stud 292 attached to the totalizer frame and carrying a roller 293 normally resting in a cut in the periphery of a disk 294 fastened to the shaft 221. Engaging a notch in the plate 291 is a stud 295 attached to the side of the frame 288. Formed on the plate 291 is a lug 297 engaged by a lug 298 formed on a pawl 299 having a slot surrounding the stud 292. A spring 300 wound about the stud 292 has one end bent around a stud 301 fastened to the totalizer frame, the other end of the spring engaging a stud 302 on the pawl 299 in such a way as to normally hold the lug 298 on the pawl in engagement with the lug 297 on the plate 291. The spring also normally holds the pawl 299 with the forward end of its slot engaging the stud 292. At the beginning of a rotation of the shaft 221 the cut in the periphery of the disk 294 will be carried from under the roller 293, thereby rocking the plate 291 clockwise (Fig. 20) to disengage the Geneva stop mechanism and this raises the rear end of the pawl 291 in position to be engaged by a stud 304 projecting from the side of the disk 294. At the end of a rotation of the shaft and disk the stud 304 will engage the end of the pawl 299 and slide it forward on the stud 292 slightly after which the pawl is freed by reverse movement of the parts and is returned to its normal position by the spring 300.

The construction is such that in turning the totalizer elements to zero the transfer teeth 262 for the lower order elements will operate the bell cranks 264 so that if the bell cranks were not restored to normal position at the first operation of the machine after turning the totalizer to zero the bell cranks would be effective to add one on their adding elements. In order to restore the bell cranks to normal position at the end of the turn to zero rotation of the shaft 221 each of the bell cranks is provided with a stud 311 (Figs. 21 and 22) in position to be engaged by an arm 312 fastened to a rock shaft 313. Fastened to the rock shaft 313 is also an arm 314 (Fig. 20) connected by a link 315 to the rear end of the pawl 299. When at the end of the rotation of the shaft 221 the stud 304 engages the rear end of the pawl 299 and slides it forward on the stud 292 as previously described the shaft 313 will be rocked, thereby causing the arms 312 to engage the studs 311 and rock the bell cranks 264 back to their original positions.

*Printing mechanism.*

The tickets for each of the three classes of tickets are drawn from a separate strip, these strips being carried in the form of rolls (not shown) in the lower part of the machine. From the rolls the strips pass up through chutes 321 (Fig. 2ᴬ) chutes 322 and chutes 323 and then through the opening 326 in the top of the machine casing. This path of the strips carries them past devices for printing on the backs of the tickets, devices for printing on the faces of the tickets and severing knives 324 and 325 after which they are ejected through the opening 326 by check ejecting mechanism, to be described later on. The mechanism for printing on the backs of the tickets comprises a cylinder 328 common to all of the strips and journaled in the side frames of the machine. This cylinder has attached to its periphery the usual type plates for printing any desired invariable matter on the backs of the tickets, there being a set of plates for each of the three classes of tickets. In the interior of the cylinder are located three sets of consecutive number and date printing type carriers, a set for each of the ticket strips. The construction of this cylinder need not be set forth in detail here as it forms no part of the present invention. The cylinder is given a complete rotation at each rotation of the driving shaft 63. For this purpose the shaft 63 has attached to its left end a gear 331 (Figs. 5 and 6) meshing with a gear 332, loosely mounted on a rod 333, the gear 332 in turn meshing with a gear 334, fastened to the left hand end of the cylinder 328.

Figure 3:
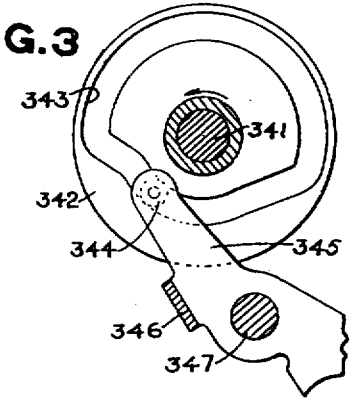
Fig. 3 is a detail of one of the cams for operating the feeding roller eccentrics and inking rollers for the back of ticket printing devices.

In order to feed tickets from any desired one of the three strips means are provided for pressing the strip into contact with the periphery of the cylinder 328 during the rotation of the driving shaft 63. The mechanism for doing this comprises a gear 337 (Fig. 2ᴬ) for each of the three classes of tickets, these gears being loosely mounted upon the rod 333 and meshing with gears 338 loosely mounted upon a rod 341. Rigid with each of the gears 338 is a disk 342 (Figs. 2ᴬ, 3 and 5) in the side of which is formed a cam groove 343 (Fig. 3) into which projects a roller 344, carried by an arm 345, formed on a frame 346, journaled on a rod 347. A rearwardly extending arm 348 of each frame carries a stud 349 engaging a slot in the forward end of a bell crank 350 pivoted on a rod 351. The rearwardly extending arms of the bell cranks 350 have adjustable connections 352 (Figs. 2ᴬ and 12) with plates 353, loosely mounted upon the rod 351. Each of the plates 353 is connected by a link 354 with a plate 355 loosely mounted upon a rod 356. Rigid with each plate 355 is a sleeve (not shown) loosely mounted upon the rod 356 and having formed on its periphery eccentrics 357 upon which eccentrics are rotatably mounted feeding rollers 360 for the strips. The cam groove 343 is so shaped that at the beginning of an operation the frame 346 will be rocked clockwise (Fig. 2ᴬ), thereby acting through the intervening connections to rotate the eccentrics 357 counter clockwise (Fig. 2ᴬ) to swing the roller 360 for the desired strip against the periphery of the cylinder 328. The eccentrics remain in this position until shortly before the shaft 63 completes its rotation by which time the back of a ticket will have been printed and the strip fed.

The printing type carried by the cylinder 328 are inked by three inking rollers 361 (Figs. 2ᴬ and 5). In the normal condition of the parts all three rollers are held out of contact with the cylinder and when the machine is operated only the roller for the strip from which the tickets are to be issued is allowed to move into contact with the cylinder. For this purpose each of the inking rollers is provided with a bearing rod 362 the ends of which engage notches in plates 363, loosely mounted on the rod 347. Springs 364 wound around the rod 347 are held against rotation of the rod by pins 365 and the ends of the springs are formed to engage the lower edges of the plates 363. The springs are constantly under tension and tend to rotate the plates 363 in a clockwise direction (Fig. 2ᴬ). This movement is normally prevented by shoulders 367 on the side arms of the frames 346 engaging studs 368, attached to the plates 363. When a frame 346 is rocked, as previously described, the shoulders 367 are, of course moved upward whereupon the spring 364 will be free to press the inking roller 361 against the cylinder 328 to ink the type as the cylinder is rotated. Each of the plates 363 is provided with a laterally extending lug 371 which can be operated to permit drawing the plates forward against the tension of the springs 364 when it is necessary to remove the inking rollers to reink or replace them. The matter on the faces of the tickets such as the price, name of the theater and any other information desired is printed from electro plates (not shown) carried on three rollers 372 (Fig. 12) loosely mounted upon eccentrics 373 (Fig. 2ᴬ), these eccentrics being carried by the usual sleeves (not shown) rotatably mounted upon a rod 374. Rigid with each eccentric bearing sleeve is a plate 375 on which is formed an arm 376 having an adjustable connection 377 with an arm 378 loosely mounted upon a rod 379. The adjustable connection 377 is provided to permit rotating the eccentrics 373 far enough to get the desired impression upon the faces of the tickets and then fastening the eccentrics in position. The rollers 372 are separately driven through gears 382, loosely mounted upon a rod 383 and meshing with gears 380 attached to the rollers. Rigid with each gear 382 is an impression roller 384 (Fig. 5) to coöperate with the corresponding printing roller 372. It will be seen from the construction just described that the cylinders 372 and feeding rollers 384 are always held in feeding engagement, thereby holding the ticket strips from reverse movement.

After passing between the printing rollers 372 and the impression rollers 384 the ticket strips are fed by auxiliary feeding devices to the severing knives. These auxiliary feeding devices comprise frames 391 (Figs. 2ᴬ and 12) loosely mounted upon a rod 392. The side plates of each frame carry a rod 393 (Fig. 2ᴬ) on which is rotatably mounted a sleeve 394, on which is formed a pair of feeding rollers 395 (Fig. 12). Wound around the rod 392 is a spring 390 one end of which engages the frame 391 and the other the rear side of the chute 323 in such a way that the spring at all times tends to rock the frame 391 clockwise (Fig. 2ᴀ) to engage the feeding rollers 395 with a feeding roller 396. This movement is normally prevented by bell cranks 397 loosely mounted upon a rod 398. Inclined portions on the rear arms of these bell cranks engage studs 399 projecting from the side plates of the frames 391 and the forwardly extending arms of the bell cranks are at all times in engagement with the peripheries of the cams 400, rigid with gears 401, meshing with the gears 382. At the beginning of an operation to feed tickets from one of the strips the cam 400 for that strip will be turned to such a position that the tension of the spring 390 will be released thereby allowing the feeding rollers 395 to be swung into engagement with the feeding roller 396. The feeding roller 396 for the selected strip rotates constantly during the rotation of the shaft 63, this movement being imparted to the roller by the gear 401 acting upon a pinion 403 rigid with the roller and when the rollers 395 are allowed to swing forward, as just described, the rollers 396 and 395 will coöperate to feed the strip forward. Toward the end of the rotation of the shaft 63 the bell crank will be swung back to its original position thereby camming the frame 391 counter clockwise (Fig. 2ᴀ) and moving the rollers 395 out of feeding engagement.

Figure 8:
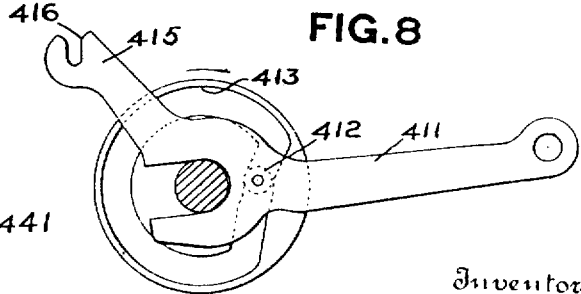
Fig. 8 is a detail of one of the cams and pitmen for operating the ticket severing knives and the ticket counters.

The knives 324 are stationary and the knives 325 movable, the two coöperating in such a way as to sever the strips. The knives 325 have openings (not shown) engaged by studs 405, carried by the cross plates of frames 406 (Figs. 2ᴀ and 12) pivotally mounted on rods 407, supported by the side arms of frames 408 loosely mounted upon the rod 379. Springs 409 (Fig. 12) coöperate with the frames 406 to hold the knives 325 against the upper surfaces of the knives 324. Pivotally connected to the right hand side arms of the frames 408 are pitmen 411 (Figs. 2ᴀ, 8 and 12) slotted to engage the rod 402 and carrying rollers 412, projecting into cam grooves 413, rigid with the gears 400. The cam grooves 413 are so shaped that at the beginning of an operation to feed tickets from a strip the pitman 411 will be thrust rearward (Fig. 8), thereby withdrawing the knife 325 from over a slot 414 (Fig. 2ᴀ) in the stationary knife 324 and holding the knife 325 in that position until near the end of the operation when the knife 325 is moved forward to sever the strip. Each pitman 411 also has an extension 415 (Figs. 2ᴀ, 2ᴮ and 8) to engage a pin 417, projecting from an operating arm 418, for the corresponding ticket counter 419. These counters are of the ordinary deep notch type and need not be described, it being sufficient to state that at each operation of a pitman 411 to sever a ticket the associated ticket counter will be operated to add one.

Figure 7:
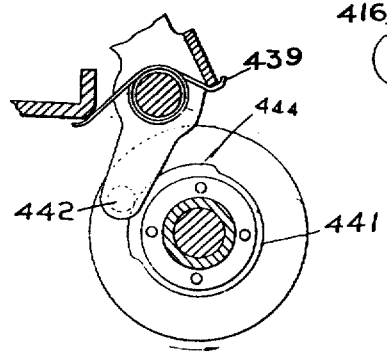
Fig. 7 is a detail of one of the cams controlling the operation of the check ejectors.

After the tickets have been severed they are projected through the openings 326 by the operation of rollers 425 (Figs. 2ᴀ, 5 and 12). These rollers are mounted on rods 426 supported by the side arms of frames 427, loosely mounted upon a rod 428. Rigid with the roller 425 is a pinion 431 meshing with a gear 432 rotatably mounted on a stud 433 attached to one of the side plates of the frame 427. The gears 432 mesh with pinions 434 which are loosely mounted on the rod 428 and mesh with the teeth of the gear 401. The gear 401 for the selected strip begins its movement as soon as the shaft 63 starts to rotate so it is clear that the roller 425 will be driven constantly as long as the shaft 63 is moving and in order to feed the severed ticket the feeding roller 425 is allowed to move into feeding engagement with rollers 437 loosely mounted upon a rod 438. For this purpose there is provided a spring 439 (Figs. 2ᴀ and 5) tensioned in such a way as to constantly tend to rock the arm 427 counter-clockwise (Fig. 2ᴀ). This movement of the frame is normally prevented by a cam 441 (Figs. 5 and 7) rigid with the gear 401 and coöperating with a stud 442, projecting from an arm 443 formed on one of the side plates of the frame 427. As soon as the gear 401 has been turned far enough to withdraw the portion 444 of the cam 441 from engagement with the stud 442, the spring 439 will rock the frame 427 to press the feeding rollers 425 and ticket strip against the rollers 437 and as the rollers 425 are at this time being driven the ticket will be ejected from the machine.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of a totalizer, a plurality of totalizer actuators constructed to add different fixed amounts, and means for selectively operating the actuators a variable number of times.

2. In a machine of the class described, the combination of a totalizer, a driving means, a plurality of normally ineffective totalizer actuators, normally disconnected from said driving means and each constructed to add a different fixed amount, and manipulative devices for selecting any desired actuator for connection with the driving means to render the desired actuator effective to operate the totalizer a variable number of times.

3. In a machine of the class described, the combination of a totalizer, a plurality of totalizer actuators each constructed to add a different fixed amount, a keyboard, means controlled by the keyboard for rendering any desired actuator effective to drive the totalizer a predetermined number of times, and means for preventing movement of the remaining actuators.

4. In a machine of the class described, the combination of a totalizer, a plurality of totalizer actuators each constructed to add a different fixed amount, a series of keys, means controlled by said keys for connecting the actuators with the totalizer and operating the same a desired number of times, and means for preventing movement of the remaining actuators.

5. In a machine of the class described, the combination of a totalizer, a driving means, a plurality of totalizer actuators each constructed to add a different fixed amount, a plurality of keys, means controlled by the keys whereby any desired actuator may be connected with the driving means and actuated a variable number of times and means for preventing operation of more than one key in a series.

6. In a machine of the class described, the combination of a main driving mechanism, a totalizer, a plurality of totalizer actuators each constructed to add a different fixed amount and normally disconnected both from the driving mechanism and the totalizer, and manipulative devices for connecting any desired actuator to the driving mechanism and totalizer and actuating the driving mechanism a variable number of times.

7. In a machine of the class described, the combination of a main driving mechanism, a totalizer, a plurality of totalizer actuators each constructed to add a different fixed amount and normally disconnected both from the driving mechanism and the totalizer, a keyboard, and means controlled by the keyboard for connecting any desired actuator to the driving mechanism and totalizer and actuating the driving mechanism a variable number of times.

8. In a machine of the class described, the combination of a main driving mechanism, a totalizer, a plurality of totalizer actuators each constructed to add a different fixed amount and normally disconnected from the driving mechanism, manipulative means for connecting any desired actuator with the driving mechanism, and means whereby operation of the driving mechanism will then connect said actuator with the totalizer and actuate it a variable number of times.

9. In a machine of the class described, the combination of a totalizer, a plurality of totalizer actuators each constructed to add a different fixed amount, means for operating any desired one of the actuators, and means common to the actuators for transmitting movement of the actuators to the totalizer, and means for actuating the driving mechanism a variable number of times.

10. In a machine of the class described, the combination of a totalizer, a plurality of totalizer actuators each constructed to add a different fixed amount, means for operating the actuators, means for preventing operation of more than one actuator at an operation of the operating means, and means for determining the actuator to be operated and means for operating the selected actuators a variable number of times.

11. In a machine of the class described, the combination of a totalizer element, a plurality of actuators for said element, each actuator being constructed to add a different fixed amount, means for rendering any desired one of the actuators effective to drive the totalizer element, and means for operating the selected actuators only a variable number of times while the remaining actuators remain idle.

12. In a machine of the class described, the combination of a totalizer, connections movable in a constant direction for operating the totalizer, structurally separate means each constructed to drive said connections to add a different amount, and means for rendering any desired one of said means effective to drive said connections a variable number of times while the remaining driving means remain idle.

13. In a machine of the class described, the combination of a totalizer, elements for driving the totalizer in a constant direction, a plurality of actuators each arranged to drive said elements to add different amounts but all normally disconnected from said elements, means for selectively connecting said elements and any desired one of the actuators, means for actuating the selected actuator a variable number of times, and means for preventing movement of the unselected actuators.

14. In a machine of the class described, the combination of a totalizer, a plurality of sets of totalizer actuators, each set being constructed so that the actuators comprising it are in fixed relation to each other and constructed to add a different fixed amount, and means for selecting any desired set of actuators for operation while the remaining sets remain idle.

15. In a machine of the class described, the combination of a totalizer, a plurality of sets of totalizer actuators, each set being constructed so that the individual actuators comprising it are fixed in relation to each other, said sets being constructed to add a different fixed amount, manipulative devices for each set of actuators, and means whereby operation of a manipulative device will establish operative relationship between the corresponding set of actuators and the totalizer.

16. In a machine of the class described, the combination of a totalizer, a plurality of sets of totalizer actuators, the actuators of each set being constructed to be fixed in of their relation to each other and to add a different fixed amount, manipulative devices, and means controlled by said devices for rendering any desired set of actuators effective to drive the totalizer.

17. In a machine of the class described, the combination of a totalizer, a plurality of sets of totalizer actuators, the actuators of each set being in fixed relation to each other and each set being constructed to add different denominational amounts, and means for establishing operative relationship between the totalizer and any desired set of actuators.

18. In a machine of the class described, the combination of a totalizer, a plurality of sets of totalizer actuators, the actuators of each set being constructed in fixed relation to each other and to add a different fixed amount, a keyboard, and means controlled by the keyboard for rendering any desired set of actuators effective to drive the totalizer.

19. In a machine of the class described, the combination of a driving mechanism, a plurality of sets of normally ineffective actuators, the actuators of each set being rigid together and each set constructed to add different denominational amounts, means for rendering any desired set of actuators effective to drive the totalizer upon operation of the driving mechanism, and manipulative devices controlling said means.

20. In a machine of the class described, the combination of a driving mechanism, a plurality of sets of normally ineffective actuators, the actuators of each set being fixed with relation to each other and constructed to have a unitary movement and each set constructed to add different denominational amounts, means for rendering any desired set of actuators effective to drive the totalizer upon operation of the driving mechanism, and a keyboard controlling said means.

21. In a machine of the class described, the combination of a totalizer, a plurality of sets of totalizer actuators, the actuators of each set being fixed in relation to each other and being constructed to add different denominational amounts, manipulative devices, means controlled by said devices for rendering any desired set of actuators effective to drive the totalizer, and connections common to the sets for transmitting movement of the actuators to the totalizer.

22. In a machine of the class described, the combination of a totalizer, a plurality of sets of totalizer actuators, the actuators of each set being fixed in relation to each other and being constructed to add different denominational amounts, a keyboard, means controlled by the keyboard for rendering any desired set of actuators effective to drive the totalizer, and connections common to the sets for positively transmitting movement of the actuators to the totalizer.

23. In a machine of the class described, the combination of a driving mechanism, a totalizer, a plurality of totalizer actuators constructed to add different amounts, means for connecting desired actuators to the driving mechanism whereby to give said connected actuators an invariable extent of movement at each operation, and manipulative devices controlling said means and means for operating the selected actuators a variable number of times.

24. In a machine of the class described, the combination of an accounting mechanism the elements of which are differentially movable, a variably rotatable shaft, actuators for the accounting mechanism each constructed to add different amounts than the others and normally disconnected from said shaft, means for selectively connecting the actuators to the shaft and thereby determining the amount to be added upon the accounting mechanism, means for variably rotating the shaft and thereby the actuators, and manipulative devices controlling both of said means.

25. In a machine of the class described, the combination of an accounting mechanism the elements of which are differentially movable, a variably rotatable shaft, a plurality of sets of totalizer actuators normally disconnected from said shaft, each of the sets being constructed to add a fixed amount, manipulative devices operable to connect any desired set of actuators and the shaft, and means controlled by the manipulative devices for variably rotating the shaft.

26. In a machine of the class described, the combination of an accounting mechanism the elements of which are differentially movable, a variably rotatable shaft, a plurality of sets of totalizer actuators normally disconnected from said shaft, each set being constructed to add a fixed amount, means for operatively connecting any desired set of actuators and the shaft, means for variably rotating the shaft, and a keyboard controlling both of said means.

27. In a machine of the class described, the combination of a driving mechanism, an accounting mechanism the elements of which are differentially movable, a plurality of accounting mechanism actuators constructed to add different amounts, means for positively connecting desired actuators to the driving mechanism whereby to give the connected actuators an invariable extent of movement at each operation, and a keyboard controlling said means.

28. In a machine of the class described, the combination of a totalizer, a variably rotatable shaft, a plurality of sets of totalizer actuators normally disconnected from said shaft, each of the sets being constructed to add a different amount, means for operatively connecting any desired set of actuators and the shaft, means for variably rotating the shaft, and a series of keys for each set of actuators, said keys controlling both of said means.

29. In a machine of the class described, the combination of a totalizer, a plurality of sets of totalizer actuators, each set constructed to add a different amount, a variably operable driving mechanism, a set of keys for each actuator, and means whereby operation of any key in a set connects the corresponding actuators to the driving mechanism and determines the extent of movement of said mechanism.

30. In a machine of the class described, the combination of a totalizer, a plurality of sets of totalizer actuators, each set constructed to add a different amount, a variably operable driving mechanism, connections common to all of the actuators for transmitting movement of actuators to the totalizer, and means whereby any desired set of actuators may be connected to the driving mechanism.

31. In a machine of the class described, the combination of a totalizer, a plurality of sets of totalizer actuators, each set constructed to add a different amount, a variably operable driving mechanism, connections common to all of the actuators for transmitting movement of the actuator to the totalizer, and a series of keys controlling each set of actuators.

32. In a machine of the class described, the combination of a driving mechanism having a cyclic movement and operable one or more cycles at a time, a totalizer, a plurality of normally ineffective totalizer actuators selectively operable to add different fixed amounts, means for selectively rendering the actuators effective, and manipulative devices controlling both said means and the driving mechanism.

33. In a machine of the class described, the combination of a driving mechanism having a cyclic movement and operable one or more cycles at a time, of a totalizer, a plurality of totalizer actuators constructed to add different fixed amounts and normally disconnected from the driving mechanism, means for selectively connecting the actuators to the driving mechanism, and manipulative devices controlling both said means and the movements of the driving mechanism.

34. In a machine of the class described, the combination of a driving mechanism having a cyclic movement and operable one or more cycles at a time, a totalizer, a plurality of sets of totalizer actuators, each set constructed to add a different amount, means for connecting any desired set of actuators to the driving mechanism, and manipulative devices controlling both said means and the driving mechanism.

35. In a machine of the class described, the combination of a driving mechanism having a cyclic movement and operable one or more cycles at a time, a totalizer, a plurality of sets of totalizer actuators, each set constructed to add a different amount, means for connecting any desired set of actuators to the driving mechanism, and a keyboard comprising keys operable singly to control both said means and the cyclic movement of the driving mechanism.

36. In a machine of the class described, the combination of a totalizer, a plurality of sets of totalizer actuators, each set being constructed so that the actuators comprising it are in fixed relation to each other, and to add an amount comprising different denominational values, means for selecting any desired set of actuators for operation, and means for operating the selected set of actuators a variable number of times.

37. In a machine of the class described, the combination of a totalizer, a plurality of sets of totalizer actuators, each set being constructed so that the individual actuators comprising it are fixed in relation to each other, said sets being constructed to add an amount comprising different denominational values, manipulative devices for each set of actuators, and means whereby operation of a manipulative device will establish operative relationship between its corresponding set of actuators and the totalizer, and means for operating the selected set of actuators a variable number of times.

38. In a machine of the class described, the combination of a totalizer, a plurality of sets of totalizer actuators, the actuators of each set being constructed to be fixed in relation to each other and to add an amount comprising different denominational values, means for establishing operative relationship between the totalizer and any desired set of actuators, and means for actuating the desired set of actuators a variable number of times.

39. In a machine of the class described, the combination of a driving mechanism, a plurality of sets of normally ineffective actuators, the actuators of each set being rigid together and each set constructed to add different denominational amounts, means for rendering any desired set of actuators effective to drive the totalizer upon operation of the driving mechanism, manipulative devices controlling said means, and means for actuating the desired set of actuators a variable number of times.

40. In a machine of the class described, the combination of a driving mechanism, a plurality of sets of normally ineffective actuators, the actuators of each being constructed to have a unitary movement and each set constructed to add different denominational amounts, means for rendering any desired set of actuators effective to drive a totalizer upon operation of the driving mechanism, a keyboard controlling said means, and means for actuating the desired set of actuators a variable number of times.

41. In a machine of the class described, the combination of a totalizer, a plurality of sets of totalizer actuators, each set being constructed to add different denominational amounts, manipulative devices, means controlled by said devices for rendering any desired set of actuators effective to drive the totalizer, connections common to the set for transmitting movement of the actuators to the totalizer, and means for actuating the desired set of actuators a variable number of times.

42. In a machine of the class described, the combination of a totalizer, a plurality of sets of totalizer actuators, each set being constructed to add different denominational amounts, a keyboard, means controlled by the keyboard for rendering any desired set of actuators effective to drive the totalizer, connections common to the set for positively transmitting movement of the actuators to the totalizer, and means for actuating the desired set of actuators a variable number of times.

In testimony whereof we affix our signatures.

FRANCESCO SKERL.
FORREST J. GRAEF.